(12) United States Patent
Ingram

(10) Patent No.: US 11,125,479 B1
(45) Date of Patent: Sep. 21, 2021

(54) APPARATUS AND PROCESS FOR AMATEUR HVAC INSTALLATION

(71) Applicant: JOI Holding LLC, Boaz, KY (US)

(72) Inventor: Jason Ingram, Boaz, KY (US)

(73) Assignee: JOI HOLDING LLC, Boaz, KY (US)

( * ) Notice: Subject to any disclaimer, the term of this patent is extended or adjusted under 35 U.S.C. 154(b) by 0 days.

(21) Appl. No.: 17/223,676

(22) Filed: Apr. 6, 2021

Related U.S. Application Data

(60) Continuation-in-part of application No. 16/838,759, filed on Apr. 2, 2020, which is a division of application No. 16/691,500, filed on Nov. 21, 2019, which is a continuation-in-part of application No. 16/503,411, filed on Jul. 3, 2019, which is a continuation-in-part of application No. 15/718,009, filed on Sep. 28, 2017, now abandoned.

(60) Provisional application No. 62/400,899, filed on Sep. 28, 2016.

(51) Int. Cl.
| | |
|---|---|
| *F25B 41/20* | (2021.01) |
| *F24F 1/0007* | (2019.01) |
| *F24F 1/20* | (2011.01) |
| *F24F 1/32* | (2011.01) |
| *F24F 13/32* | (2006.01) |
| *F24F 1/0003* | (2019.01) |
| *B23P 15/26* | (2006.01) |

(52) U.S. Cl.
CPC .............. *F25B 41/20* (2021.01); *B23P 15/26* (2013.01); *F24F 1/0007* (2013.01); *F24F 1/20* (2013.01); *F24F 1/32* (2013.01); *F24F 13/32* (2013.01); *F24F 1/0003* (2013.01); *F24F 2221/36* (2013.01)

(58) Field of Classification Search
CPC .......... F25B 41/20; F25B 41/24; F25B 41/40; F24F 1/0003; F24F 1/0007; F24F 1/20; F24F 1/26; F24F 1/32; F24F 1/34; F24F 2221/36
See application file for complete search history.

(56) References Cited

U.S. PATENT DOCUMENTS

| | | | |
|---|---|---|---|
| 2,359,648 A | 10/1944 | Jones | |
| 2,628,850 A | 2/1953 | Smmerville | |
| 2,771,308 A | 11/1956 | Vitcha et al. | |
| 2,883,813 A | 4/1959 | Shannon | |
| 2,959,027 A * | 11/1960 | Ewing | F25B 41/37 62/160 |
| 3,039,794 A | 6/1962 | Cenzo | |

(Continued)

*Primary Examiner* — Jianying C Atkisson
*Assistant Examiner* — Miguel A Diaz
(74) *Attorney, Agent, or Firm* — Patterson Intellectual Property Law, P.C.; Seth R. Ogden; Alex H. Huffstutter

(57) ABSTRACT

Apparatuses, systems, and methods for providing non-expert installation of HVAC systems are provided. The HVAC system includes an indoor unit, an outdoor unit, a first pre-charged refrigerant line-set, a second pre-charged refrigerant line-set, and a line-set coupler, each containing pre-pressurized refrigerant securely positioned therein prior to engagement between two or more of the aforementioned elements. The first pre-charged refrigerant line-set is couplable between an indoor unit refrigerant port of the indoor unit and a first coupler end of the line-set coupler. The second pre-charged refrigerant line-set is couplable between an outdoor unit refrigerant pot of the outdoor unit and a second coupler end of the line-set coupler.

20 Claims, 25 Drawing Sheets

(56) References Cited

U.S. PATENT DOCUMENTS

| | | | | |
|---|---|---|---|---|
| 3,208,232 | A * | 9/1965 | Madison | F25B 45/00 62/77 |
| 3,337,244 | A | 8/1967 | Appleberry | |
| 3,611,743 | A * | 10/1971 | Manganaro | F24F 1/32 62/263 |
| 3,802,216 | A * | 4/1974 | Brandimarte | F24F 1/022 62/262 |
| 4,321,797 | A * | 3/1982 | Yaeger | F24D 17/02 62/238.6 |
| 4,378,923 | A | 4/1983 | Takei | |
| 4,540,021 | A | 9/1985 | Rogers | |
| 4,753,268 | A * | 6/1988 | Palau | F16L 37/0841 137/595 |
| 4,852,611 | A | 8/1989 | Knerr et al. | |
| 5,123,446 | A | 6/1992 | Haunhorst et al. | |
| 5,191,770 | A * | 3/1993 | Kim | F24F 1/0003 285/273 |
| 5,215,122 | A | 6/1993 | Rogers et al. | |
| 5,220,810 | A | 6/1993 | Keltner | |
| 5,323,808 | A | 6/1994 | Shimizu | |
| 5,363,671 | A * | 11/1994 | Forsythe | F25C 1/04 62/197 |
| 5,445,290 | A * | 8/1995 | Forsythe | F25B 41/20 222/129.1 |
| 5,464,042 | A * | 11/1995 | Haunhorst | B60H 1/00571 137/595 |
| 5,896,922 | A * | 4/1999 | Chrysler | H05K 7/20818 165/165 |
| 5,934,364 | A * | 8/1999 | Chrysler | F25B 39/024 165/170 |
| 5,954,127 | A * | 9/1999 | Chrysler | F28F 3/12 165/170 |
| 6,158,229 | A * | 12/2000 | Aizawa | F25B 45/00 62/77 |
| 6,189,328 | B1 * | 2/2001 | Mochizuki | F24F 1/0057 62/298 |
| 6,662,587 | B2 * | 12/2003 | Rembold | F25B 41/40 62/292 |
| 6,848,670 | B2 * | 2/2005 | Haunhorst | F25B 45/00 251/149.6 |
| 7,007,493 | B2 * | 3/2006 | Kadle | B60H 1/00507 62/244 |
| 10,132,541 | B2 | 11/2018 | Kawabe et al. | |
| 10,156,369 | B2 * | 12/2018 | Booten | F16L 5/10 |
| 10,760,795 | B2 * | 9/2020 | Booten | F16L 29/04 |
| 2003/0015679 | A1 * | 1/2003 | Haunhorst | F25B 45/00 251/149.6 |
| 2003/0106715 | A1 | 6/2003 | Clemmons | |
| 2003/0192335 | A1 * | 10/2003 | Rembold | F25B 41/40 62/292 |
| 2012/0119032 | A1 * | 5/2012 | Benassi | F16L 11/10 244/135 R |
| 2012/0318005 | A1 * | 12/2012 | Lingrey | F24F 1/20 62/77 |
| 2015/0115597 | A1 * | 4/2015 | Lorraine | F16L 57/02 285/115 |
| 2018/0080668 | A1 * | 3/2018 | Booten | F24F 13/02 |
| 2019/0383515 | A1 | 12/2019 | McGraw et al. | |
| 2020/0370764 | A1 * | 11/2020 | Strickland | F24F 1/32 |
| 2021/0088251 | A1 * | 3/2021 | Martinez Galvan | F24F 1/0003 |

* cited by examiner

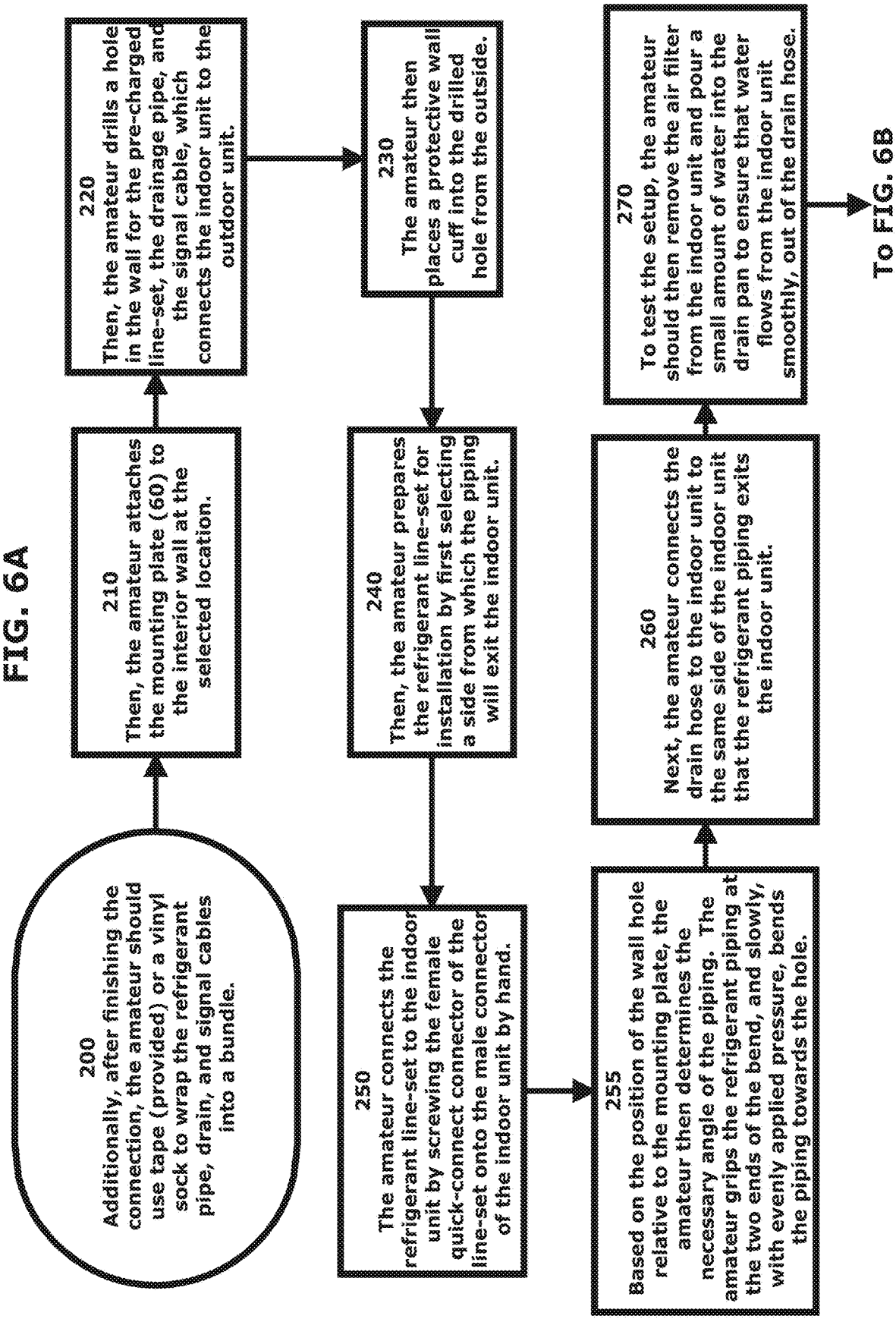

FIG. 7B

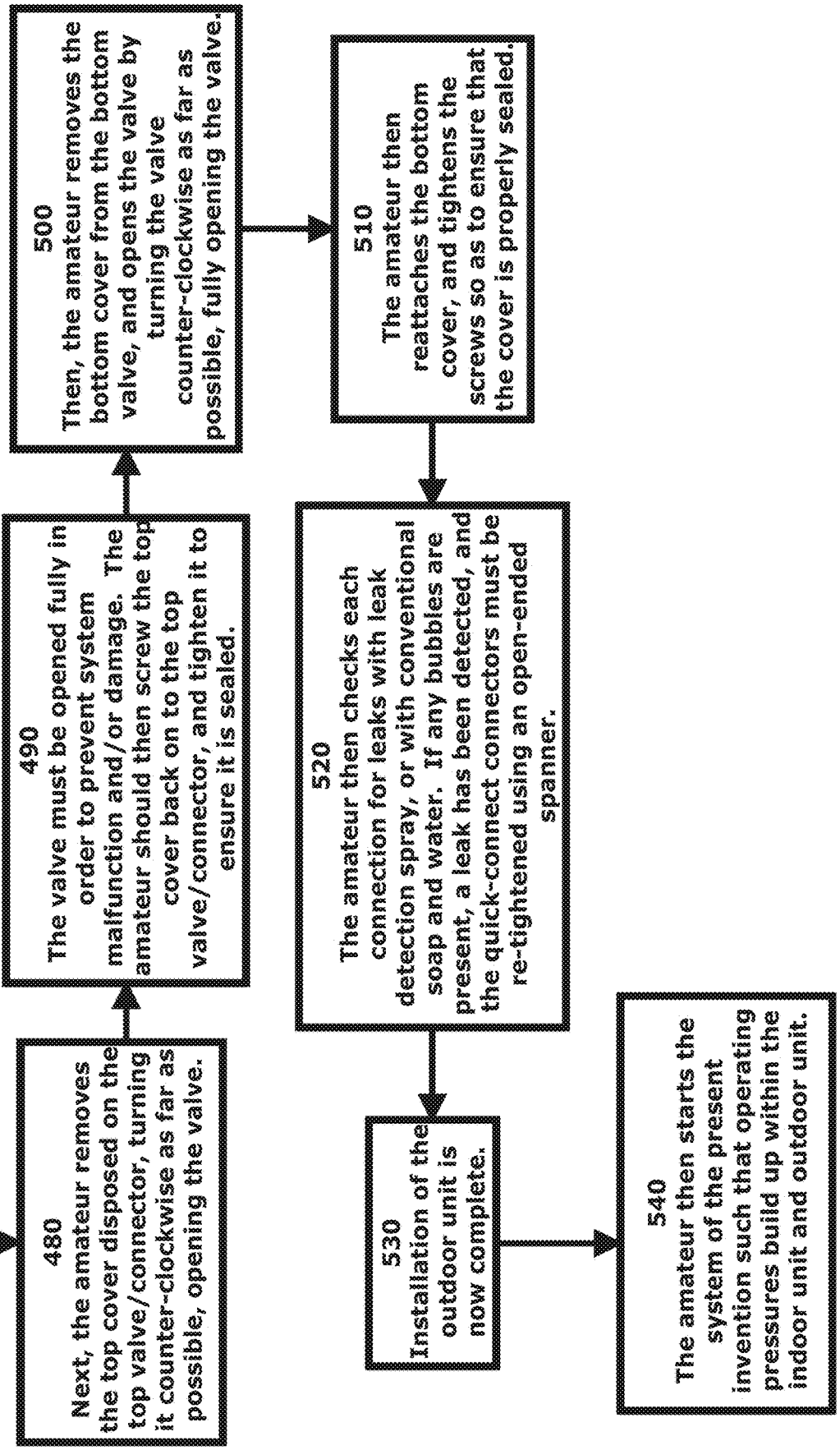

From FIG. 7A

480 — Next, the amateur removes the top cover disposed on the top valve/connector, turning it counter-clockwise as far as possible, opening the valve.

490 — The valve must be opened fully in order to prevent system malfunction and/or damage. The amateur should then screw the top cover back on to the top valve/connector, and tighten it to ensure it is sealed.

500 — Then, the amateur removes the bottom cover from the bottom valve, and opens the valve by turning the valve counter-clockwise as far as possible, fully opening the valve.

510 — The amateur then reattaches the bottom cover, and tightens the screws so as to ensure that the cover is properly sealed.

520 — The amateur then checks each connection for leaks with leak detection spray, or with conventional soap and water. If any bubbles are present, a leak has been detected, and the quick-connect connectors must be re-tightened using an open-ended spanner.

530 — Installation of the outdoor unit is now complete.

540 — The amateur then starts the system of the present invention such that operating pressures build up within the indoor unit and outdoor unit.

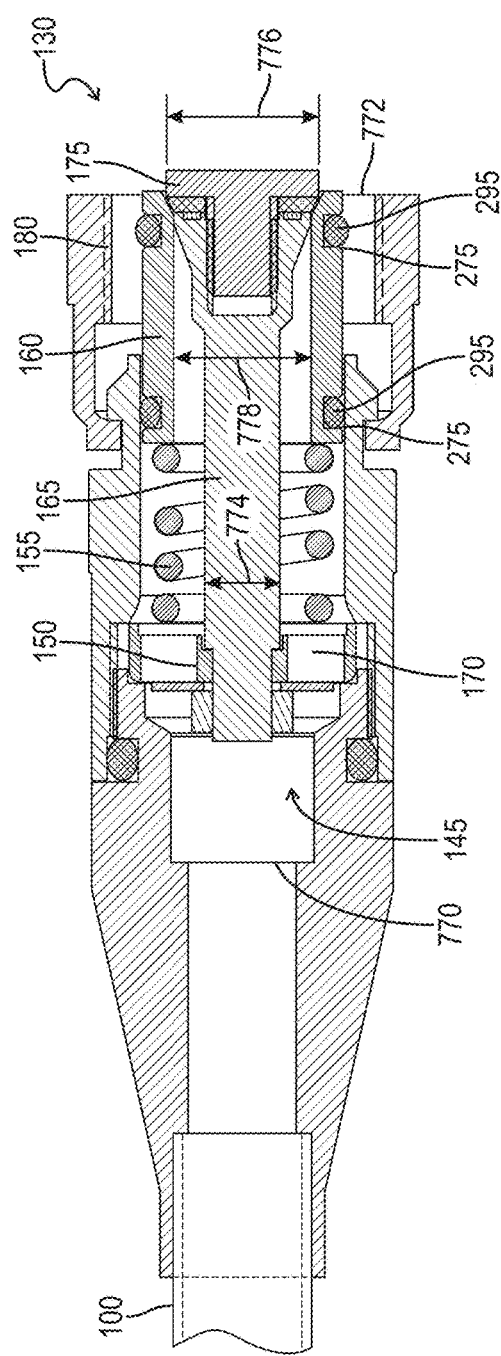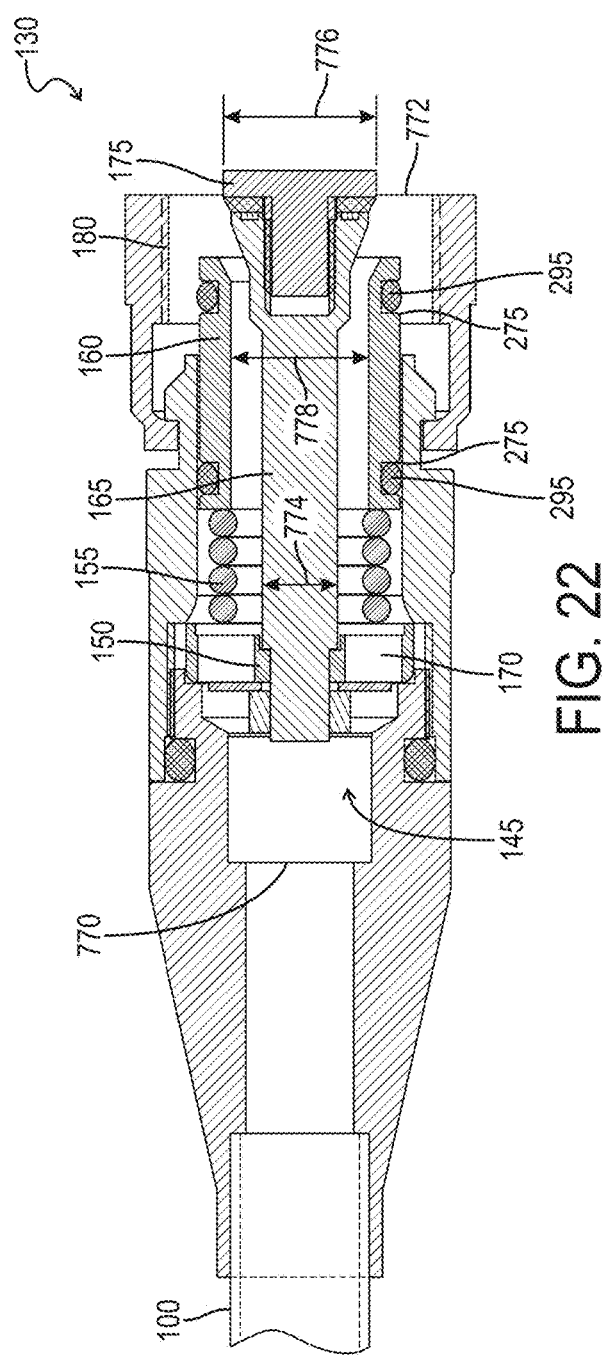

APPARATUS AND PROCESS FOR AMATEUR HVAC INSTALLATION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a Continuation-in-Part application of Divisional application Ser. No. 16/838,759 filed Apr. 2, 2020.

This application claims benefit of the following patent applications which are hereby incorporated by reference: U.S. patent application Ser. No. 16/838,759 filed Apr. 2, 2020 which is a Divisional application of U.S. patent application Ser. No. 16/691,500 filed Nov. 21, 2019, which is a Continuation-in-Part Application of U.S. patent application Ser. No. 16/503,441 filed Jul. 3, 2019, which is a Continuation-in-Part Application of U.S. patent application Ser. No. 15/718,009 filed Sep. 28, 2017, which is a Non-provisional Application and which claims priority based upon U.S. Patent Application Ser. No. 62/400,899 filed Sep. 28, 2016, which is a Provisional Application.

BACKGROUND

1. Field of the Invention

The present invention generally relates to HVAC systems. More particularly, this invention pertains to an HVAC solution equipped with pre-pressurized line-sets and which configured to be safely installed and maintained by an amateur without professional assistance.

2. Description of the Prior Art

The heating, ventilating, and air conditioning (HVAC) industry designs and manufactures air conditioner and heat pump systems that modify air temperature in residential and commercial buildings. Such products are typically distributed through a chain of HVAC contractors who are also responsible for the installation and warranty support of the product. This system has resulted in a modern marketplace with very high costs for the end-user. Product technology and design is the main force driving these high costs.

Historically, air conditioners and heat pumps relied on chemical refrigerants to move heat in or out of the interior environment. While the exact chemical formula has changed over the years, chemical refrigerants are the best technology by which to modify interior air temperature, but their presence in the system vastly complicates the installation process. Professional personnel rely on specialized equipment like a vacuum pump in order to properly charge a system in the field. This requirement virtually guarantees the average homeowner cannot install or maintain the product they purchase themselves.

Socioeconomic factors further stratified air conditioners and heat pumps into expensive products requiring specialist assistance to utilize. The mid-20th century emphasis on large, suburban homes allowed duct-connected systems to dominate the marketplace, since a ducted system is the most efficient way to condition such spaces. The reliance on ductwork carried intrinsic costs of its own while further emphasizing the necessity of specialist training to properly install any purchased product. Only the most technologically sophisticated end-users could purchase and install their own home HVAC system without relying on expensive, skilled labor.

Compounding the cost problem, HVAC manufacturers systematically divided the domestic market into territories where only one or two wholesale distributors could provide product to a similarly limited number of field installation companies. HVAC manufacturers often required such field installation companies to complete specific training courses in order to be officially certified to install the manufacturer's product. Non-certified installation often voids the warranty agreement.

Market division of this nature simplified the distribution chain, but it decreased competition in local markets. It also allowed field installation companies to greatly inflate the product price by 100% or more. The installation companies could do so, because their skills were required to install and service the complicated, ducted technology most readily available. The near monopoly some local companies held on certain brands reinforced the tendency to inflate price.

Overall, manufacturer emphasis on field refrigerant charging, ducted systems, specialized labor, and stringent warranty requirements created a market in which the end-user is forced to pay many times the manufacturing cost of the product in order to purchase and install it.

The room air conditioner was the first attempt to simplify the product for the end-user. Brugler proposed a system that was self-contained and pre-charged. It could be installed through a large hole cut into a wall to allow the condenser access to the exterior environment while the evaporator distributed conditioned air into the interior. The design is fundamentally sound, but has its own problems.

The requisite compact footprint of the design forced a compromise in terms of capability. The miniaturized coils and compressor condition air, but at decreased efficiency compared to traditional ducted installations. Higher energy costs in the intervening years have exacerbated the problem.

Air distribution is another problem with the room air conditioner. The through-the-wall or window installation combined with a comparably simple fan limit the design's ability to move air effectively throughout an interior environment.

Manganaro (U.S. Pat. No. 3,611,743A) essentially shows a room air conditioner, but one that is divided between a separate interior air handler and an exterior condenser. Flexible connections allowed great installation versatility and simplified installation. Unfortunately, the reliance on a standard wall outlet for power generation limited the product operating capacity. The refrigerant line coupling point was also inferior compared to conventional connections at the time and modern techniques.

Pre-charged refrigerant lines for manufactured housing were another means by which it was attempted to simplify the installation process. Rembold et al. (U.S. Pat. No. 6,662,587 B2) fabricated an invention that allowed a fixed length, pre-charged line to be quickly field-installed in a conventional, ducted split system in manufactured housing. This was innovated due to the fact that most manufactured housing was sold with an HVAC system included in the design. The standardized nature of manufactured housing allowed both the split system components and the refrigerant line to be appropriately pre-charged to adequately condition the known interior environment.

Unfortunately, this design alone is inadequate to deal with the innumerable variables found in non-manufactured housing. Stick-built homes vary tremendously in terms of architectural characteristics, requisite HVAC operating capacity, and local factors. These make it difficult or impossible to use a pre-charged line of specific length with a ducted split system.

The most sophisticated approach to simplifying HVAC technology for the end-user was the design taught by Lingrey et al. (U.S. Pat. No. 8,850,832 B2). Essentially, the design combined Rembold et al. pre-charged refrigerant line-set with Manganaro's compact split system and other modern HVAC innovations. The result is a flexible split system that can be readily installed without sophisticated training.

The downside of the Lingrey's ductless mini-split system is its reliance on a standard wall outlet for power, and its use of a locking lever-style dual-refrigerant connector. The locking lever-style connection can operate effectively, but it is prone to leaking and can be difficult to detach without suffering refrigerant loss after the connection is made. If the end-user desired to move the system and lost refrigerant in the process of disconnecting the lock lever connection, a skilled technician would be required to correctly charge the system such that it is operational.

In brief, the previous efforts to field a heat pump or air conditioner that may be easily installed by the end-user suffer a number of disadvantages, as follows:

(a) Overall energy efficiency has been a problem with many of the room air conditioner designs. Efficiency optimization was not a major consideration for HVAC products when Brugler (1969) and Manganaro (1971) created their designs, but the market has changed considerably in the intervening four decades. Federal law holds manufacturers to higher standards than in the past. Eco-conscious and cost-concerned consumers also expect HVAC products to meet certain thresholds.

(b) The principle advantage a simpler HVAC product offers the end-user is the ability to utilize air conditioning technology without being forced to handle and/or manipulate chemical refrigerants. Virtually all previous designs strive towards this paradigm, but many fall short in one way or another. Some create connection points prone to leakage while others are difficult to disengage once the line is connected to the condenser. The former defeats the purpose of the product in the first place while the latter may merely prolong the period before a skilled technician is required to service the operating system.

(c) The trend to rely on a standard electrical wall outlet to power the unit eliminates the need for an electrician to wire the system, but can drastically reduce the potential capacity any such system might produce. This significantly limits the application of such products. As some of the designs require cutting through a wall for installation, the versatility offered by reliance on a wall outlet as opposed to conventional wiring is compromised.

(d) Inadequate airflow and uneven distribution are perennial problems for room air conditioners. The ability to install in an existing window frame grants flexibility, but severely limits airflow movement in a target zone. The aforementioned reliance on a wall outlet electrical connection also limits the power available to operate the interior fan. Ineffective conditioned air control serves to limit the applications in which such a product can reasonably function.

During the conventional process of installing conduit, flexing and bending the conduit (such as a copper line-set of the present invention) into an ideal position is commonly performed. Flexible conduit tubing is designed to flex, however it is usually unable to flex near or beyond 90 degrees due to the nature of the seals of the flexible housing of the conduit tubing.

Unfortunately, conduit can be over-flexed during installation, especially by a novice, or when installation is performed in a hurry. If a section of conduit is not sized appropriately, a bend may be necessary to ensure the conduit fits within the designed space available. When flexible conduit (line-set) is bent too far, irreparable damage to the conduit occurs, often causing one or more holes in the conduit tubing. When bent to the point of breakage, the conduit must be replaced with a new conduit. This can generally occur with the self-installation of copper piping in which the installation individual bends the piping too much. In such cases, instead of the conduit bending and having a sealed tube within it, the tube is folded, which may cause breakage, or at the least, weaken the piping. This causes a problem of the conduit piping having a crimp in the bend, restricting the flow inside. A hard bend or crimp such as this can also cause holes, causing it to leak. Breakage generally occurs when an improper bending technique is used, which can cause imperceptible defects in the metal when under stress. Otherwise, with the proper technique, a metal refrigerant line can be safely bent 90 or even 180 degrees.

If there were a way by which a protective mechanism could prevent a user from bending the conduit to the point of breakage, materials could be saved, damage by water could be prevented, and installation could be simplified.

BRIEF SUMMARY

Accordingly, there is a need for a new HVAC ductless or ducted system, configured for simplified installation by an amateur that has greater efficiency than present duct-free designs on the market, has adequate airflow, is not necessarily reliant on a wall outlet for power, has line-sets which are pre-charged with chemical refrigerants, and may be controlled remotely via a WiFi connection. Such a system is preferably configured to employ quick-connect connection mechanisms equipped with a unique auto-sealing valve disposed at all connection points of the line-set. The line-sets are also equipped with preinstalled insulation, as well as a protection device configured to ensure amateur users may not over-bend the line-set during installation, compromising the line-set.

There is an additional need for the line-set of the system of the present invention to be outfitted with a conduit protection apparatus configured to ensure that installation by the amateur yields a safe and damage-free result. Such a protection apparatus is preferably present in the form of a spring-like coil which circumscribes the entirety of the line-set to prevent bends of the line-set during installation beyond a specific angular tolerance to prevent any compromise of the integrity of the line-set.

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one embodiment an improved apparatus and process for amateur ductless HVAC installation comprises a pre-charged evaporator and condenser, connecting pre-charged refrigerant lines, Wi-Fi control capability, wall-mounting bracket, and electrical connectors. The present invention includes an indoor unit and an outdoor unit.

Accordingly, several advantages of one or more aspects of the present invention are preferably as follows: to provide an HVAC system that does not require connection to ductwork, that can be installed without special tools, which, when operational, provides a leak-free seal between the refrigerant lines and the main components. The system of the present invention can be mounted high on a wall to evenly distribute conditioned air throughout a zone. Additionally, the system can be manufactured in varying capacities to address variable air comfort needs, and that can be safely disconnected without refrigerant loss should movement be required, that will effectively provide cooling and/or heating, and that will function at an efficiency level in line with current consumer and industry expectations.

The present invention is unique in that it requires no specialized tools to install. Additionally, the line-set does not need to be vacuumed or pressurized with refrigerant since all units are pre-charged with refrigerant during manufacturing, and valves disposed within quick-connectors at the terminals of the line-set ensure pressurized refrigerant remains in place within the lines until the moment of connection with the indoor unit and outdoor unit. As such the charged refrigerant can not be released into the atmosphere during a normal installation. All conventional split systems and most ductless split systems require the lines be vacuumed and the refrigerant charged during installation. In short, this means that no special training is required to install the basic system components of the present invention, in contrast to existing split systems.

The present invention also includes a conduit protection device configured for use on copper or other metallic flexible piping conventionally used to carry water, refrigerant, or other liquids, but is namely designed for use on the quick-connect line-sets of the present invention.

The protection device is preferably flexible, and amounts to a spiraled, low gauge wire loosely wrapped around the conduit tubing such as the copper line-set of the present invention. The device is configured to facilitate bending of the flexible line-set only to a certain degree, and no further, in order to prevent breakage of the line-set. The device is configured to remain in position on the conduit, such as refrigerant piping, once it is bent. After the bend is produced, the rings of the spiraled, low gauge wire are inherently concentrated at the site of the bend.

BRIEF DESCRIPTION OF THE SEVERAL VIEWS OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein:

FIG. 6A depicts a flow chart detailing the process of installation of the indoor unit of the system of the present invention by an amateur.

FIG. 7B is a continuation of the flow chart of FIG. 7A.

FIG. 21 shows an enlarged cross-sectional front elevation view a female quick-connect connector of the ductless HVAC system of FIG. 1 in a closed configuration.

FIG. 22 shows an enlarged cross-sectional front elevation view the female quick-connect connector of FIG. 21 in an open configuration.

DETAILED DESCRIPTION

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 10:
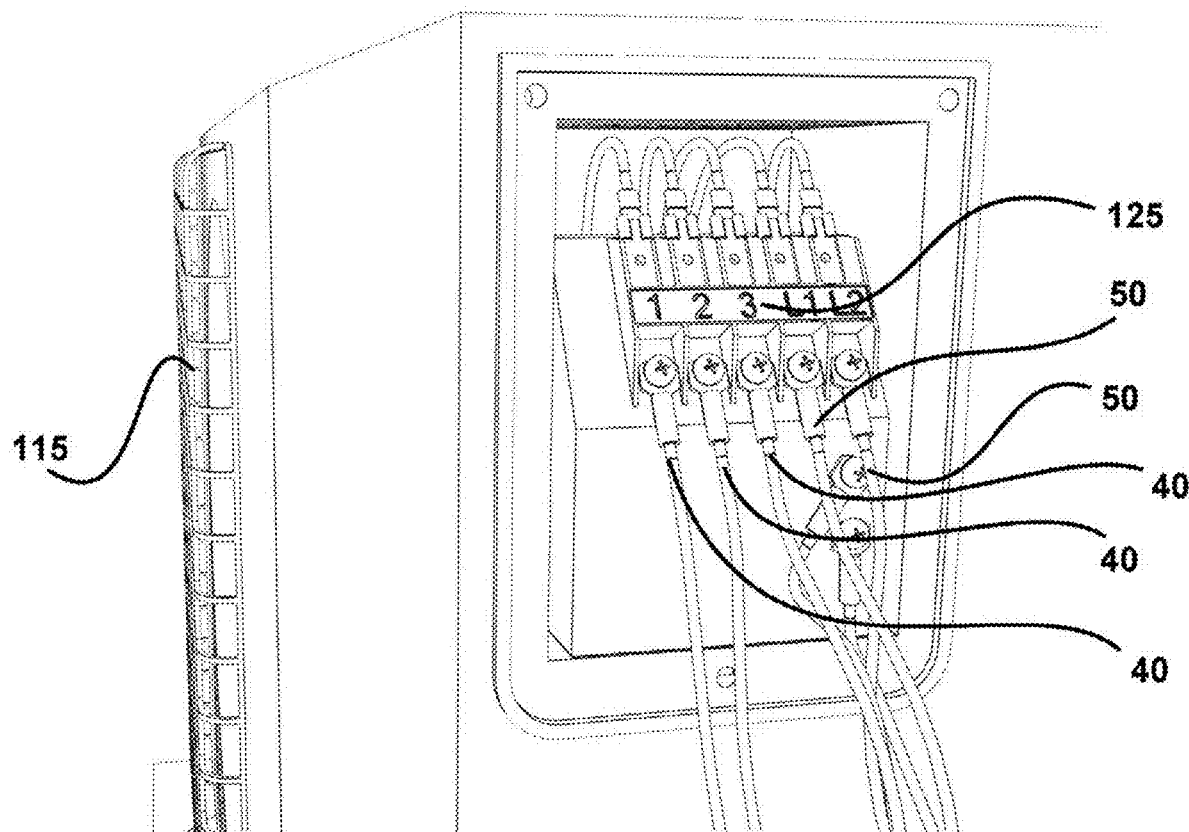
FIG. 10 displays a perspective view of electrical wire connecting ductless HVAC condenser to an exterior breaker box.

The present invention is a ductless HVAC system configured for simplified installation by an amateur without an HVAC license or certification. The system of the present invention includes an indoor unit (10) and an outdoor unit (20). The indoor unit (10) is in communication with the outdoor unit (20) via pre-charged refrigerant piping, referenced as pre-charged line-sets (30), and signal cables (40), configured to connect to at least one connection point (125) of the outdoor unit (20), also referenced as a terminal block (78). The pre-charged line-sets (30) may also be referred to herein as pre-charged refrigerant piping (30), pre-pressurized refrigerant piping (30), pre-pressurized line-sets (30), or the like. There are preferably three signal cables (40), labeled as 1, 2, and 3 in FIG. 10. There are preferably two power cables (50), labeled L1 and L2 in FIG. 10. The connection points (125) may be equipped with different labels depending on the power supply to which they are to be installed (i.e. 115v or 208/230v).

In short, when packaged, the system and apparatus of the present invention is preferably bundled with the following components:
  the indoor unit (10), the outdoor unit (20), a mounting plate (60), screws, a remote control (80), pre-charged line-sets (30), an air freshening filter (35), a drain joint, and user manuals.

An optional remote control holder (15) may also be included in some embodiments of the present invention, which is configured to hold a remote control (80) designed to enable users to control the airflow and temperature as desired.

Figure 1:
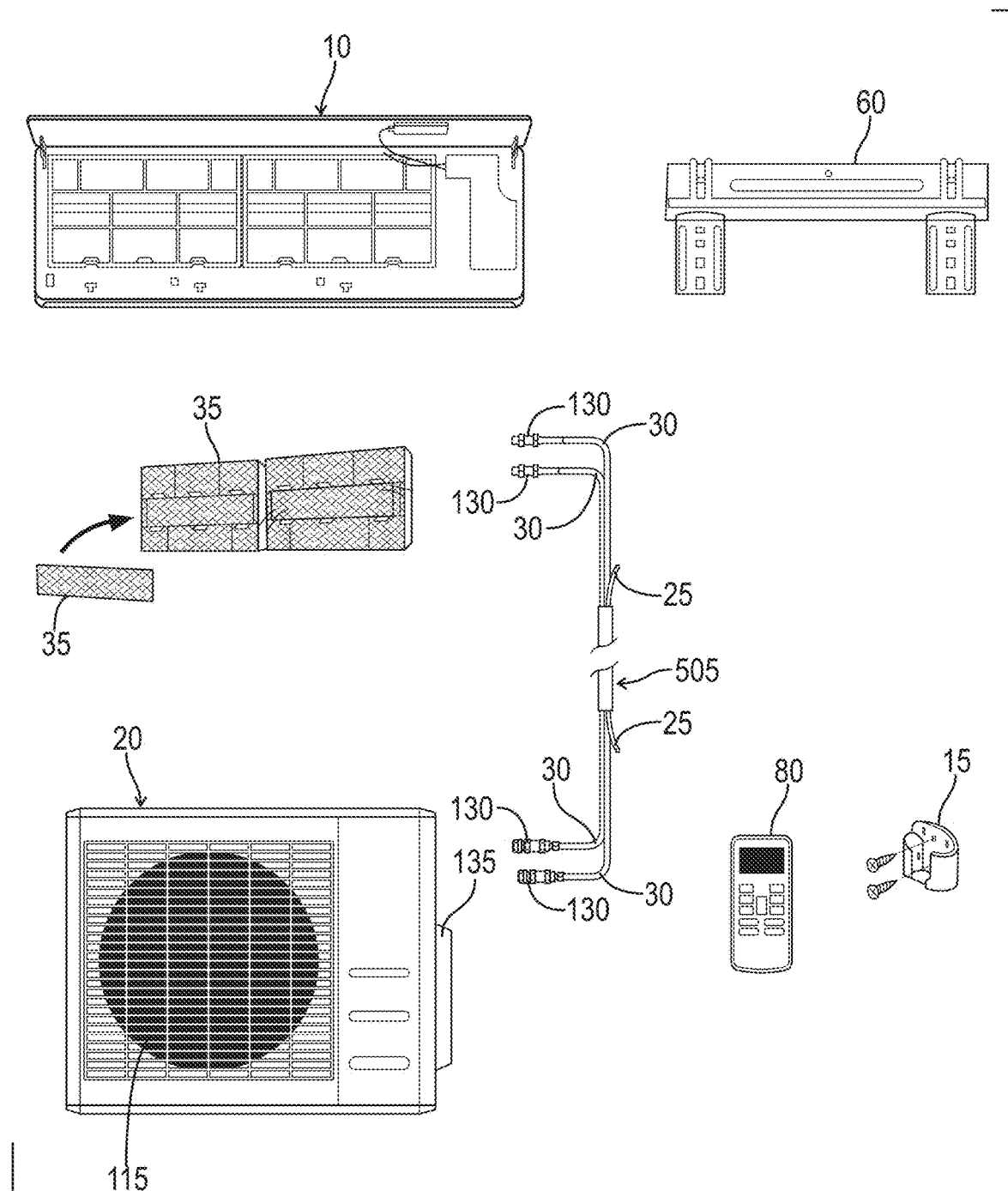
FIG. 1 shows a cross-section of a ductless HVAC system installed with an interior air handling unit connected via line-sets to an exterior condenser unit in accordance with one embodiment.
Figure 2A:
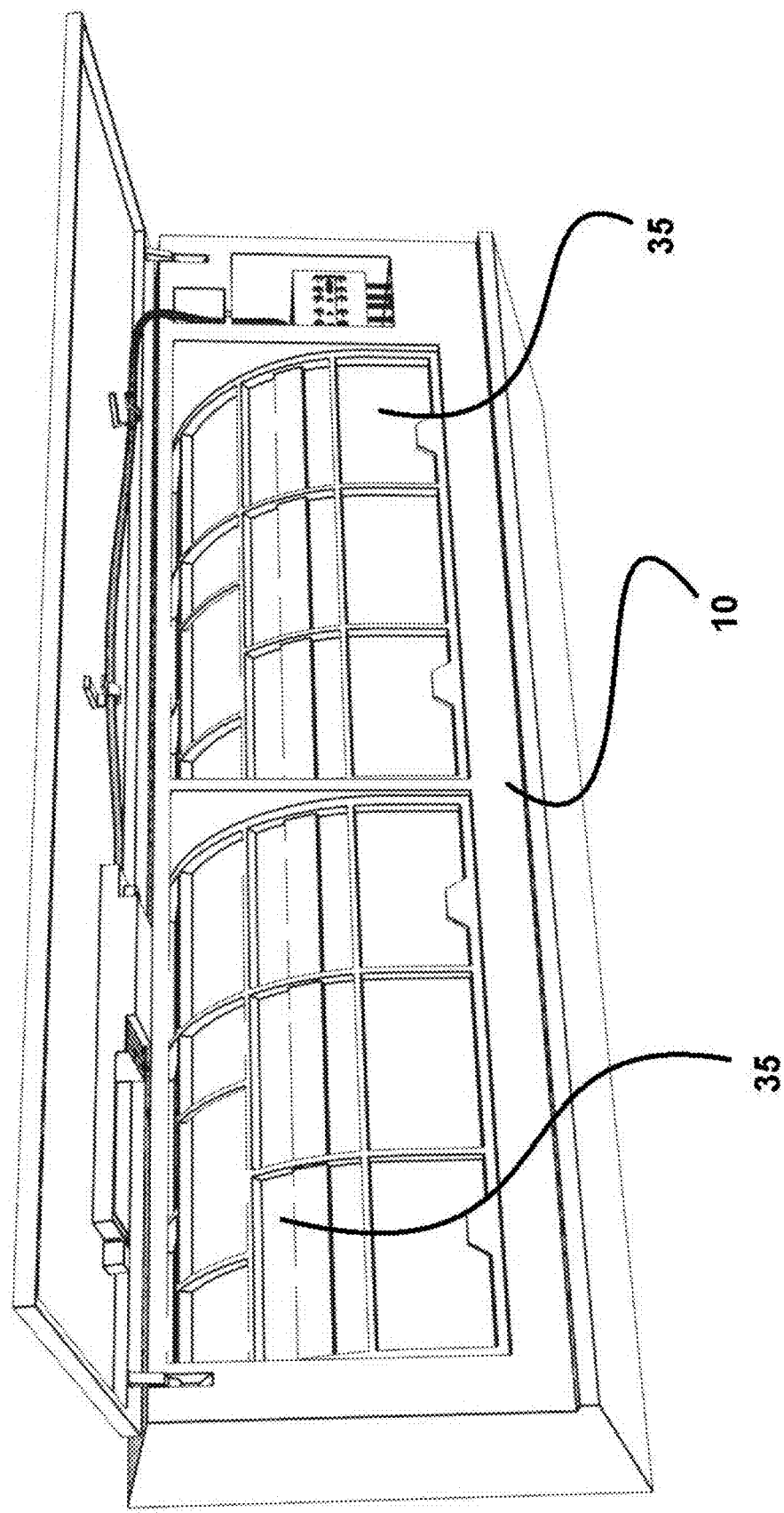
FIG. 2A shows a ductless air handling unit installed on an interior wall in accordance with one embodiment of the present invention.
Figure 2B:
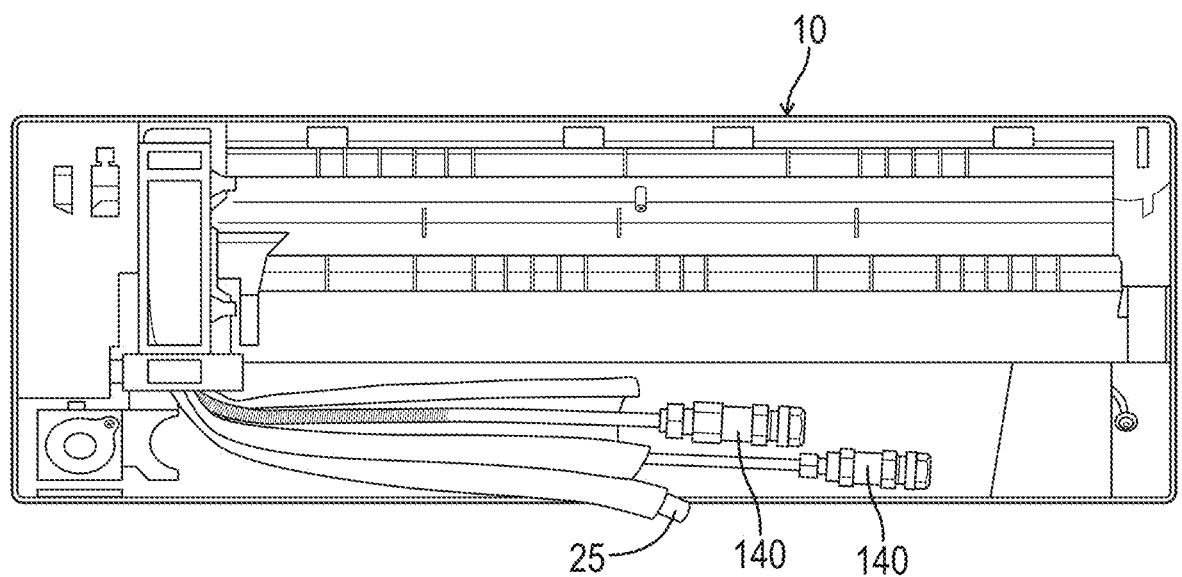
FIG. 2B shows a rear side of the ductless air handling unit of FIG. 2A in accordance with one embodiment of the present invention.
Figure 3:
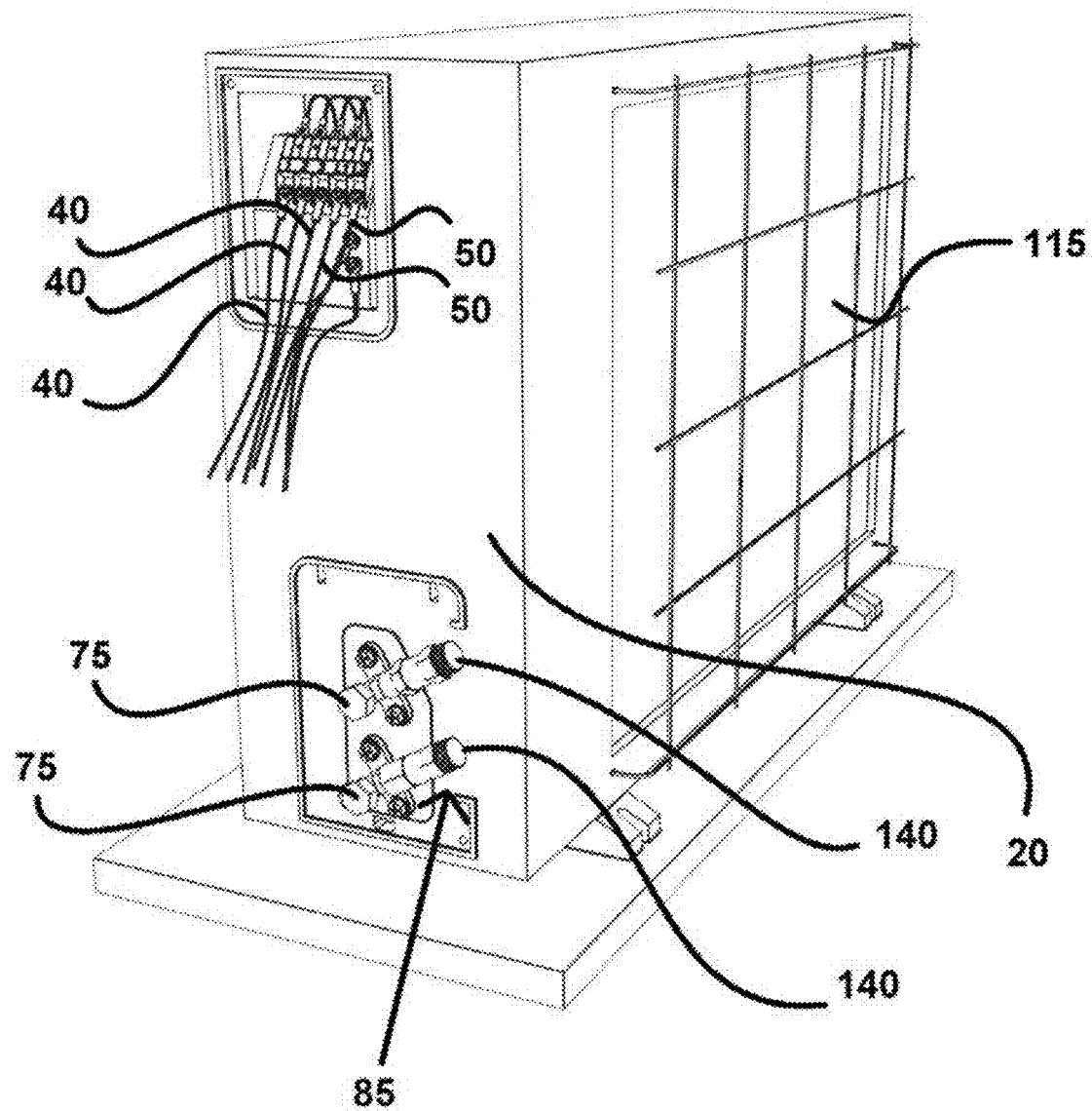
FIG. 3 shows a partial view of the condenser's electrical and refrigerant connections in accordance with one embodiment of the present invention.
Figure 4:
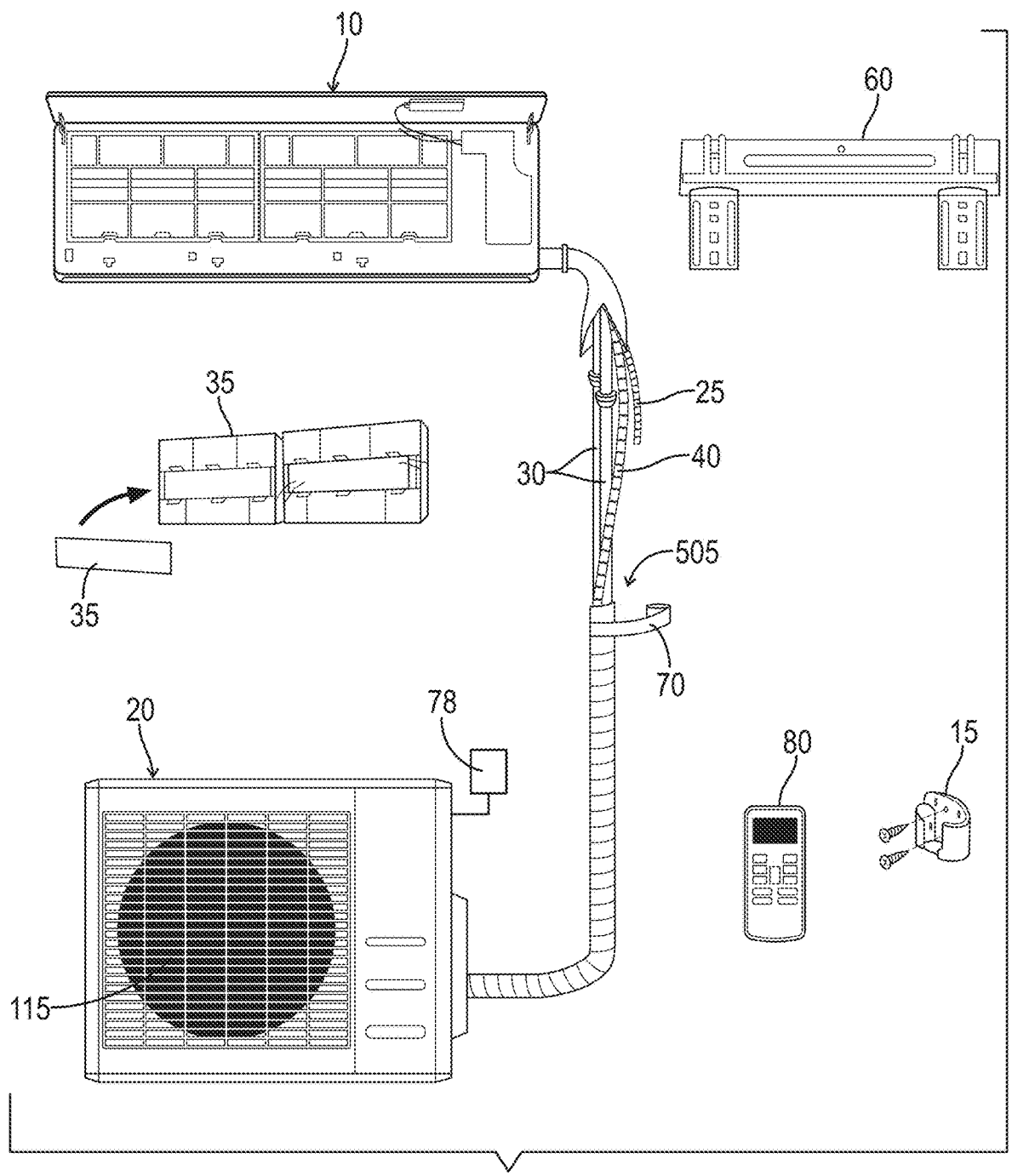
FIG. 4 depicts a front view of the system of the present invention assembled and connected, without showing the structure of the building or wall for clarity.
Figure 5:
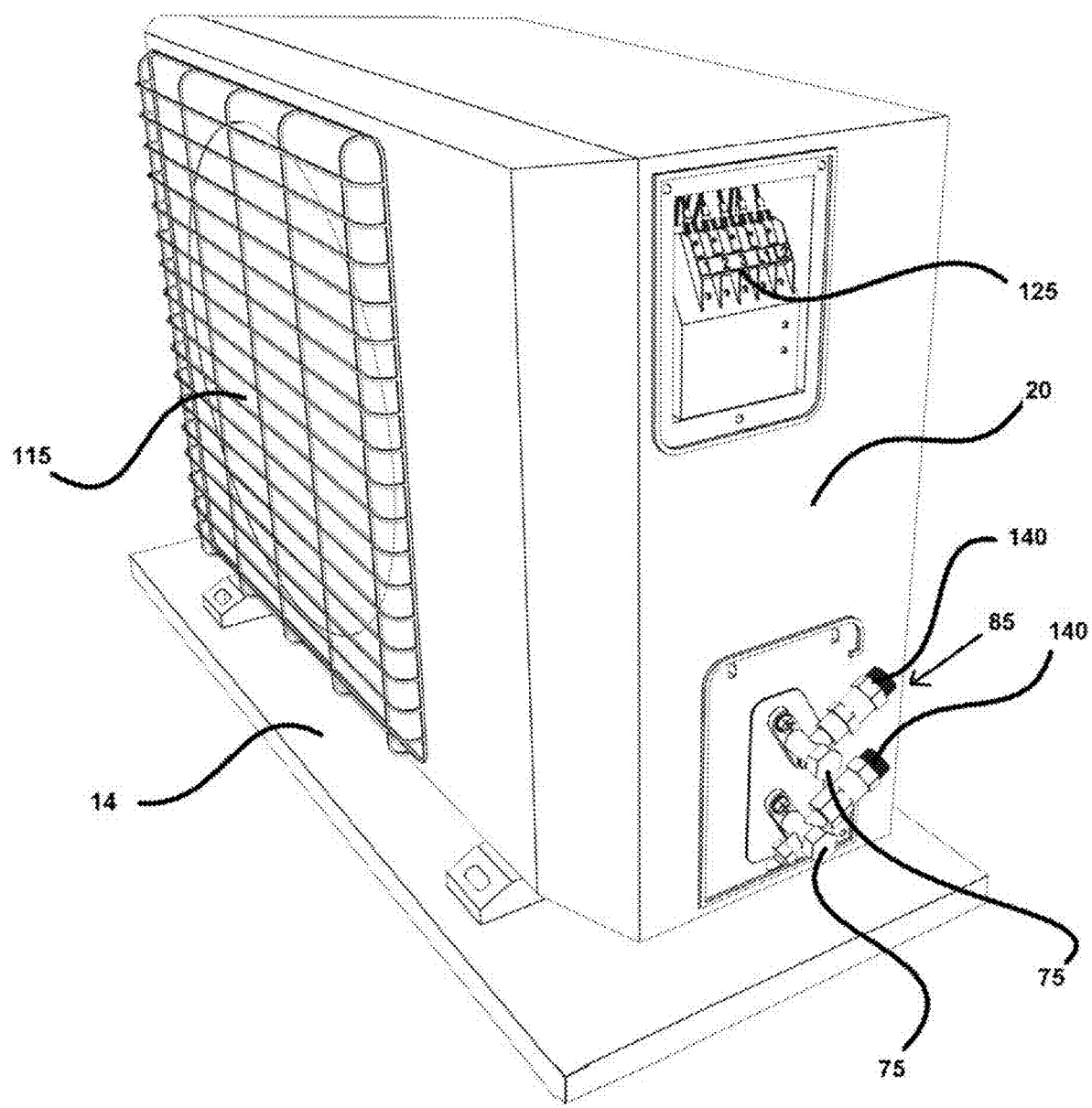
FIG. 5 displays a ductless condenser installed on the exterior ground in accordance with one embodiment of the present invention.

The system of the present invention is preferably equipped with a ductless HVAC condenser, a mounting plate (60), a condenser grill (115), and a condenser electrical cover (105). The condenser grill (115) is disposed in communication with the ductless HVAC condenser. The ductless HVAC condenser is preferably equipped with electrical wiring disposed within the condenser electrical cover, and is configured to power the system of the present invention via conventional household current. The present invention employs conventional refrigerants; however they are preinstalled to the factory recommended pressure. The ductless HVAC condenser is equipped with a condenser refrigerant cover (135), which is configured to house refrigerant connection points (85) exhibiting a male quick-connect connector mechanism (140) of the present invention. The mounting plate (60) is included with the system and is employed to mount the indoor unit (10) of the system in the preferred location selected by the user as shown in FIG. 1. It should be noted that the refrigerant connection points (85) are equipped with male quick-connect connectors (140), each configured to attach to a pre-charged line-set (30). As shown in FIG. 2B, the indoor unit (10) includes male quick-connect connectors (140) coupled to a rear side of the unit. There are preferably two iterations of pre-charged line-set (30), one for a suction line and one for a liquid line, each equipped with a copper conduit pipe outfitted with the protective coil (110) wrapped around the copper conduit pipe.

As with conventional systems, an air filter (35) is preferably employed to filter the air, despite the lack of ducts of the system. Conduit cabling, in communication with a breaker box of the structure conveys power to the system via the at least one power cable (50). A drain hose (25) is disposed near a bottom of both the indoor unit (10) and the outdoor unit (20) of the present invention, and is configured to drain excess condensation of the system. The drain hose (25) may also be referred to herein as a drain pipe (25).

The present invention is unique in that no vacuum is required on the refrigerant lines, providing for installation by an amateur. Additionally, no refrigerant charging is necessary during installation, unlike conventional ducted HVAC units. Valves of the pre-charged line-set (30) (disposed at both ends of each iteration of pre-charged line-set (30), shown as female quick-connect connectors (130), as well as on the refrigerant connection points (85) themselves, shown as male quick-connect connectors (140)) are closed automatically upon disconnection, and the pre-charged line-set(s) (30) may be detached (unscrewed) to move the unit (the entire indoor unit (10) and outdoor unit (20)) after installation, maintaining the refrigerant within the system and within the pre-charged line-set (30) during transit. Unlike other conventional window units, the system of the present invention is configured to be wired directly into a breaker box, such that the production capacity may be larger than conventional ductless HVAC units that rely on a wall plug outlet, helping to better meet the needs of the end user.

A front panel of the indoor unit (10) is equipped with function buttons, which may also be controlled remotely via the remote control (80) or a connected mobile device. The function buttons include, but are not limited to an ON/OFF button, a MODE button, a COOL button, and a HEAT button. Function buttons are preferably also present on the remote control (80).

Figure 6B:
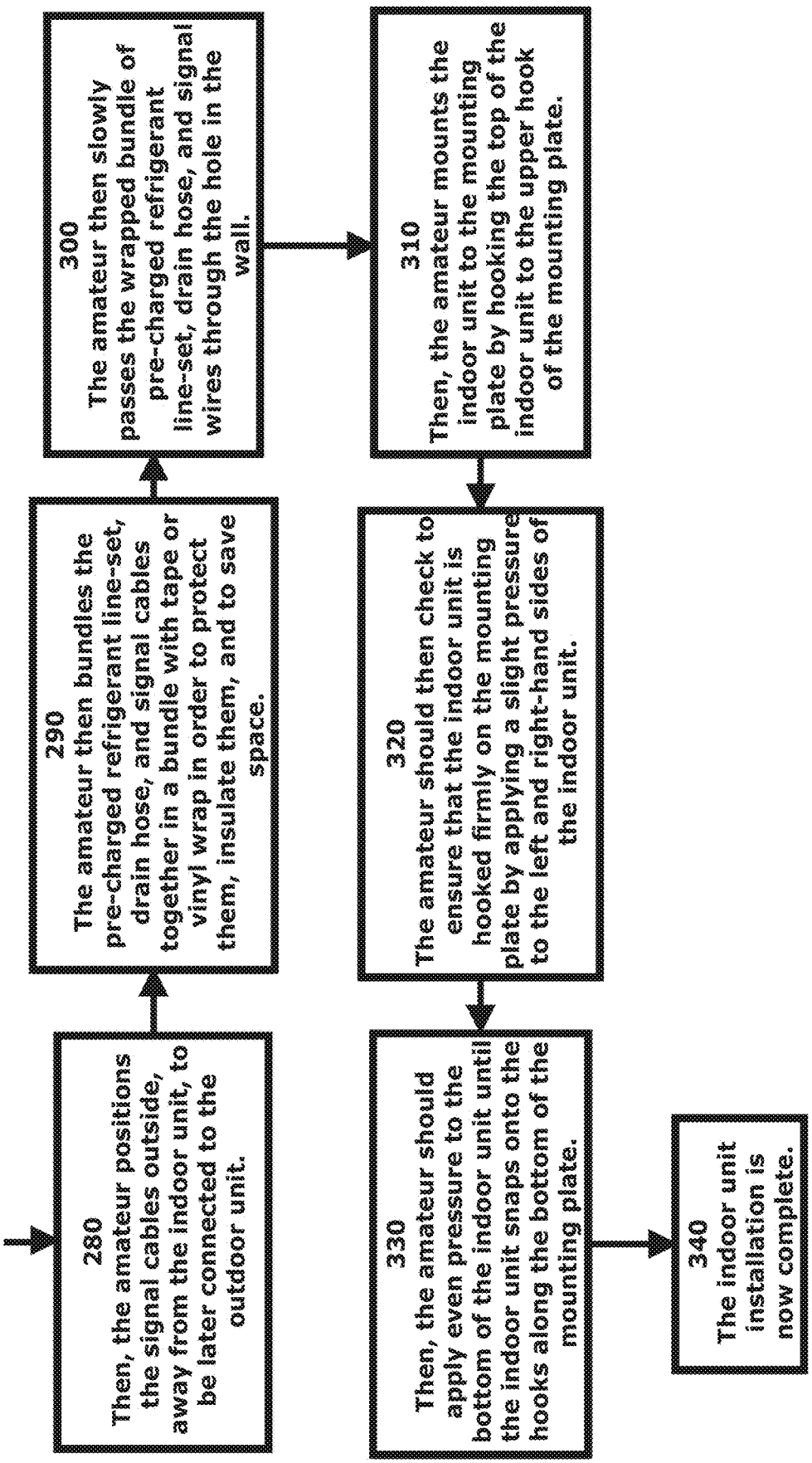
FIG. 6B is a continuation of the flow chart of FIG. 6A.

The process of installation of the indoor unit (10) of the present invention by an amateur, as shown in FIGS. 6A and 6B, is preferably as follows:

1. First, the amateur selects an installation location. (200) The amateur should ensure that the selected installation location meets the following standards: adequate air circulation, convenient drainage, noise is minimized such that it does not disturb other people, a location that is strong enough to support the weight of the indoor unit (10), a firm and solid location for the outdoor unit (20), and a location that is at least one meter away from all other electrical devices, such as a TV, radio, computer, etc.

2. Then, the amateur attaches the mounting plate (60) to the interior wall at the selected location. (210) The mounting plate is the device on which the amateur will mount the indoor unit (10) within the structure. To attach the mounting plate (60), the user removes the mounting plate (60) from the packaging of the indoor unit (10), places the mounting plate (60) against the wall in a location that meets the standards above, and then drills holes for mounting screws in locations which are equipped with studs such that they may support the weight of the indoor unit (10).

Figure 11:
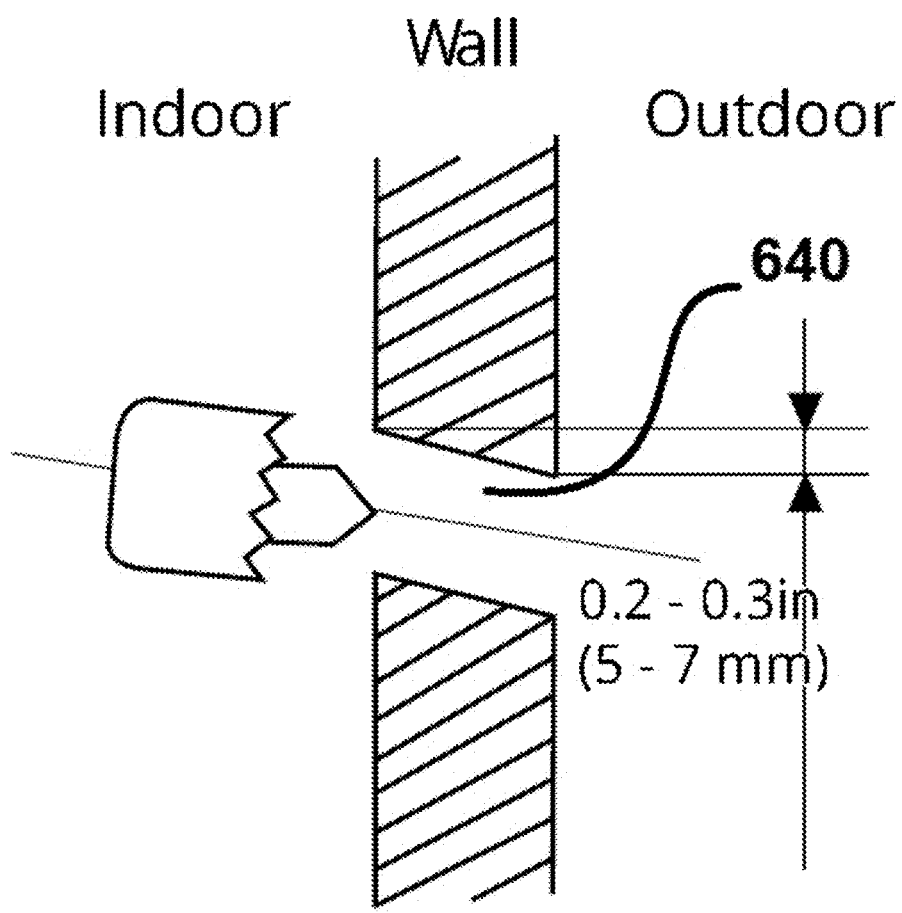
FIG. 11 exhibits a view of the ideal wall cutout required for installation of the present invention, detailing an approximate 5 mm to 7 mm decline to facilitate drainage.
Figure 12:
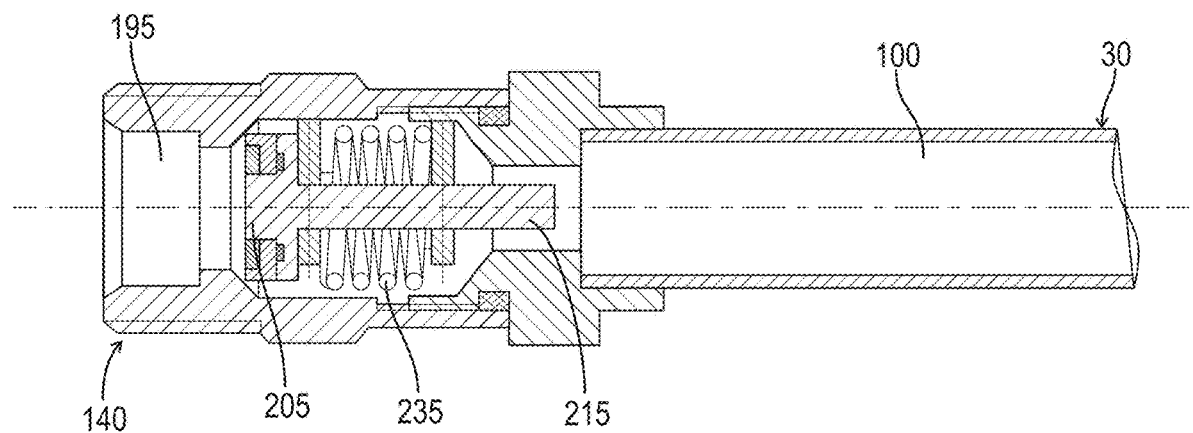
FIG. 12 depicts a cutaway close-up view of the male quick-connect connector of the present invention as seen from the side.

3. Then, the amateur drills a hole (640) in the wall for the pre-charged line-set (30), the drain hose (25), and the signal cables (40), which connects the indoor unit to the outdoor unit. (220) To do so, the amateur determines the location of the wall hole based on the position of the mounting plate. The wall hole should be at least 90 mm (3.54 inches) from the side of the unit, and at a slightly lower angle to facilitate drainage via the drain hose (25). The amateur then uses a 90 mm core drill (or similar) to drill a hole in the wall, making sure that the hole is drilled at a slight downward angle such that the outdoor end of the hole is lower than the indoor end by 5-7 mm to ensure proper water drainage. It should be noted that the amateur should be careful to avoid wires, plumbing, and other sensitive components conventionally disposed in household walls when drilling. The hole is preferably sloped five degrees from the interior of the structure to the exterior of the structure, through the wall. An example of the wall hole can be seen in FIG. 11.

4. The amateur then places a protective wall cuff into the drilled hole from the outside. (230) The protective wall cuff protects the edges of the hole (640), and will help to seal it when the amateur finishes the installation process.

5. Then, the amateur prepares the refrigerant line-set for installation by first selecting a side from which the piping will exit the indoor unit. (240) The amateur connects the refrigerant line-set to the indoor unit (10) by screwing the female quick-connect connector of the line-set onto the male connector of the indoor unit by hand. (250) Based on the position of the wall hole relative to the mounting plate, the amateur then determines the necessary angle of the piping. The amateur grips the refrigerant piping at the two ends of the bend, and slowly, with evenly applied pressure, bends the piping towards the hole. (255) The amateur should be sure to avoid denting or damaging the piping during the process. The protective coil (110) of the pre-charged line-set (30) helps to ensure the amateur does not over-bend the refrigerant piping.

6. Next, the amateur connects the drain hose to the indoor unit to the same side of the indoor unit that the refrigerant piping exits the indoor unit. (260) The amateur attaches a drain hose extension (if necessary) to the end of the drain hose. The amateur should be sure to wrap the connection point firmly with Teflon™ tape to ensure a good seal, and to prevent leaks. For the portion of the drain hose that remains indoors, the amateur should wrap it with foam pipe insulation to prevent condensation. To test the setup, the amateur should then remove the air filter from the indoor unit and pour a small amount of water into the drain pan to ensure that water flows from the indoor unit smoothly, out of the drain hose. (270)

7. Then, the amateur positions the signal cables outside, away from the indoor unit, to be later connected to the outdoor unit. (280) The signal cables (40) between the air handler (indoor unit (10)) and the condenser (outdoor unit (20)) are preferably connected to the air handler at the factory. The signal cables (40) enable communication between the indoor unit and the outdoor unit. The preferred power cable (50) for the indoor unit (10) is preferably H05VV-F or H05V2V2-F. The power cable (50) of the outdoor unit (20) is preferably a H07RN-F cable, and the signal cables (40) connecting the indoor unit (10) to the outdoor unit (20) are preferably H07RN-F cables. The installing amateur is advised to take caution, and to follow any and all electrical regulations.

Figure 9:
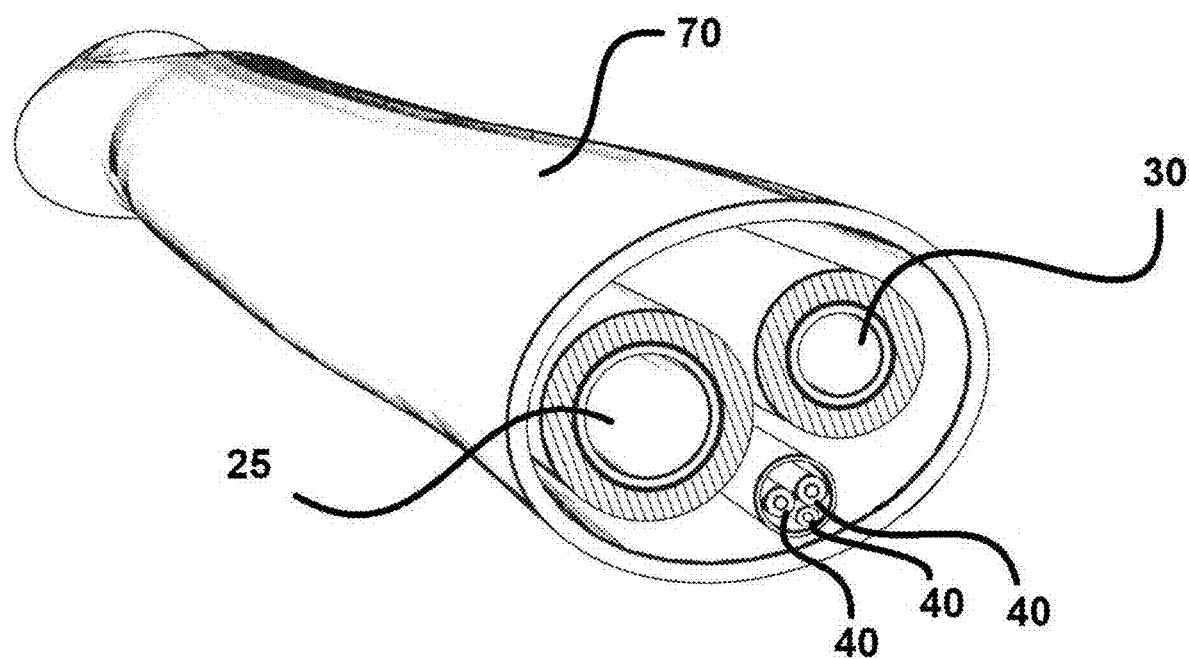
FIG. 9 show a cross-section of conduit cable with pre-charged refrigerant lines, electrical wire, and drain hose.

8. The amateur then bundles the pre-charged line-set, drain hose, and signal cables together in a bundle (505) with tape or vinyl wrap (70) in order to protect them, insulate them, and to save space. (290) The bundling can be seen in FIG. 9. The drain hose must be disposed on the bottom of the bundle, as placing the drain pipe at the top of the bundle can cause the drain pan to overflow, which can lead to fire or water damage. The vinyl wrap (70) may be present in the form of a vinyl sock which may be pre-installed onto the pre-charged line-set (30), drain hose (25) and signal cables (40) to facilitate installation by the amateur.

9. The amateur then slowly passes the wrapped bundle of pre-charged refrigerant line-set, drain hose, and signal wires through the hole in the wall. (300)

10. Then, the amateur mounts the indoor unit to the mounting plate by hooking the top of the indoor unit to the upper hook of the mounting plate. (310)

11. The amateur should then check to ensure that the indoor unit is hooked firmly on the mounting plate by applying a slight pressure to the left and right-hand sides of the indoor unit. (320) Ideally, the indoor unit should not wiggle or shift under the pressure when installed correctly and securely.

12. Then, the amateur should apply even pressure to the bottom of the indoor unit until the indoor unit snaps onto the hooks along the bottom of the mounting plate. (330) The amateur should check again that the indoor unit is firmly mounted by applying slight pressure to the indoor unit to ensure that it does not budge.

13. The indoor unit installation is now complete. (340)

Figure 7A:
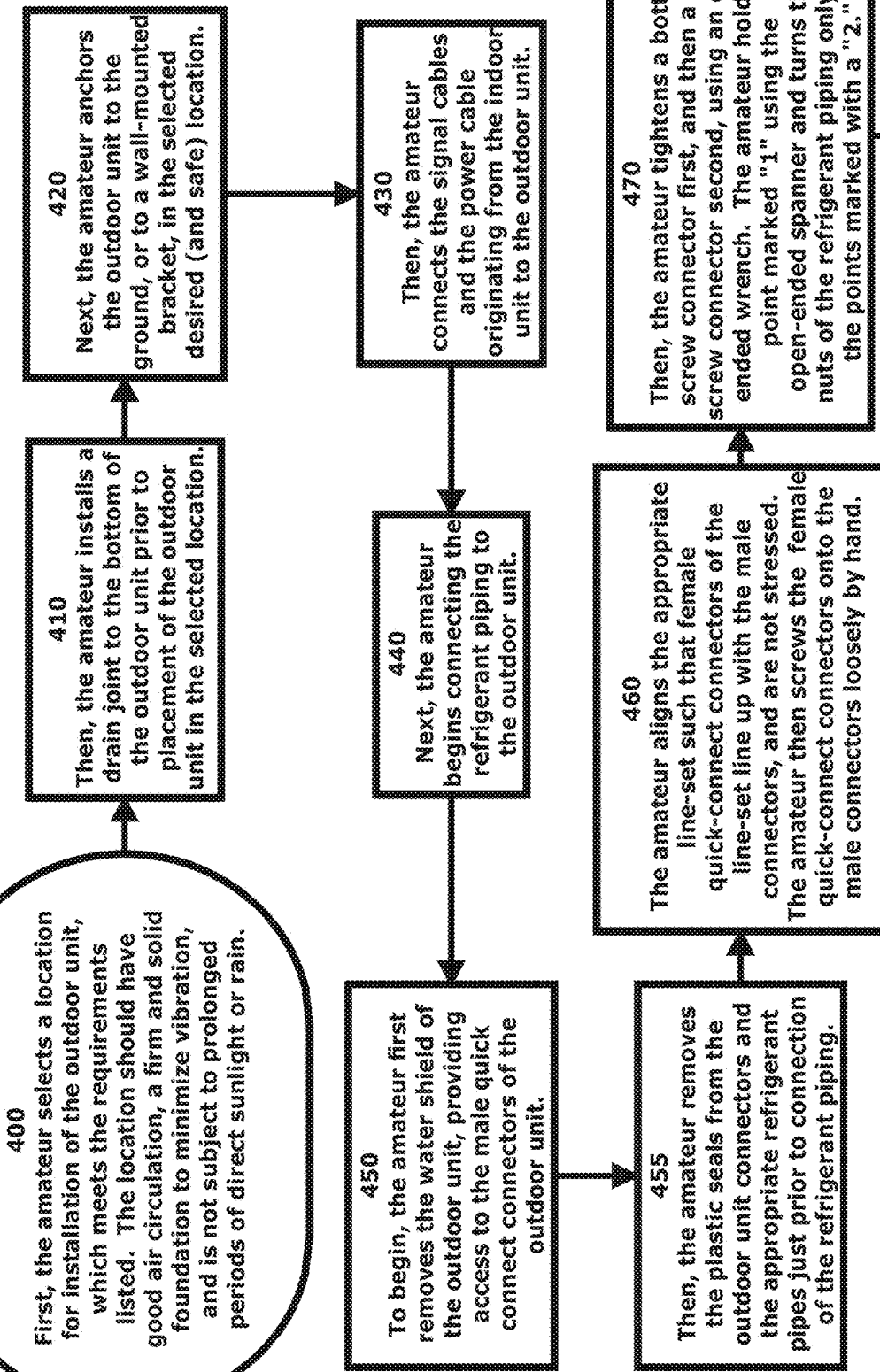
FIG. 7A details a flow chart showing the process of installation of the outdoor unit of the system of the present invention by an amateur.
Figure 8:
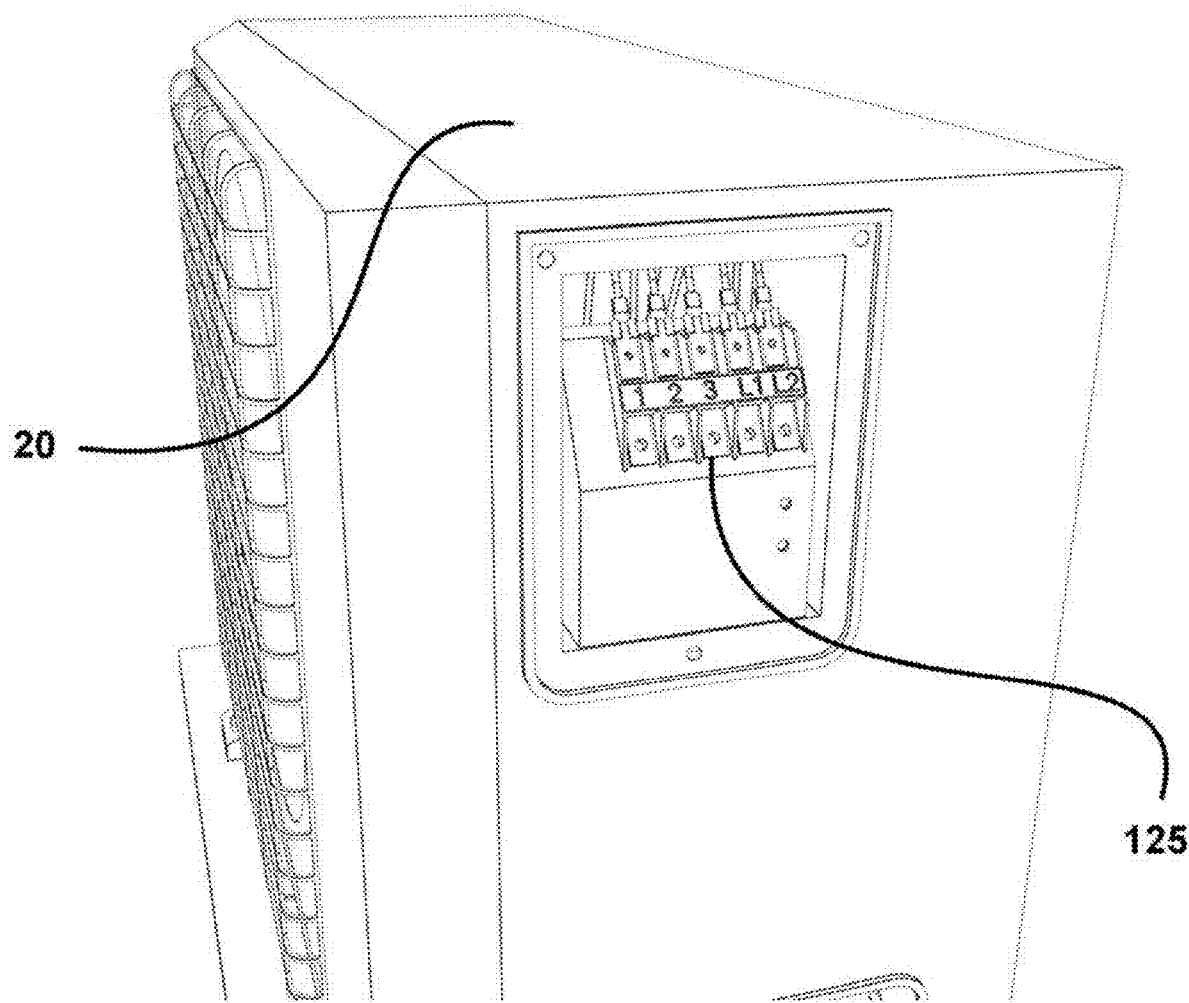
FIG. 8 is a perspective view of the electrical connections for a ductless HVAC condenser.

The installation process of the outdoor unit (20), as performed by an amateur, and as shown in FIGS. 7A and 7B is preferably as follows:

1. First, the amateur selects a location for installation of the outdoor unit, which meets the requirements listed below. Namely, the location should have good air circulation, a firm and solid foundation to minimize vibration, and is not subject to prolonged periods of direct sunlight or rain. (400) Such a foundation, shown as platform (14), may be made of concrete or similar hardened flat surface.

2. Then, the amateur installs a drain joint to the bottom of the outdoor unit prior to placement of the outdoor unit in the selected location. (410) Installation of the drain joint may require use of a rubber seal and/or a drain hose extension if needed.

3. Next, the amateur anchors the outdoor unit to the ground, or to a wall-mounted bracket, in the selected desired (and safe) location. (420) The outdoor unit may be installed to the ground, on a mounting platform, or on a wall bracket designed for ductless mini-split condensers. A concrete pad may be poured, however thick plastic pads are also conventionally used. The amateur should mark the positions for four expansion bolts used for mounting the outdoor unit to a concrete platform/foundation. The amateur drills holes for the expansion bolts into the concrete, and cleans any concrete dust away from the holes prior to placement of the expansion bolts. Per convention, the amateur places a nut on the end of each expansion bolt, and hammers the expansion bolts into the drilled holes. The amateur then removes the nuts, and places the outdoor unit onto the bolts. A washer is then placed on each expansion bolt, and the nuts are then tightened down on the expansion bolts, securing the outdoor unit to the platform. A wrench is preferably used to tighten the nuts until snug.

Figure 17:
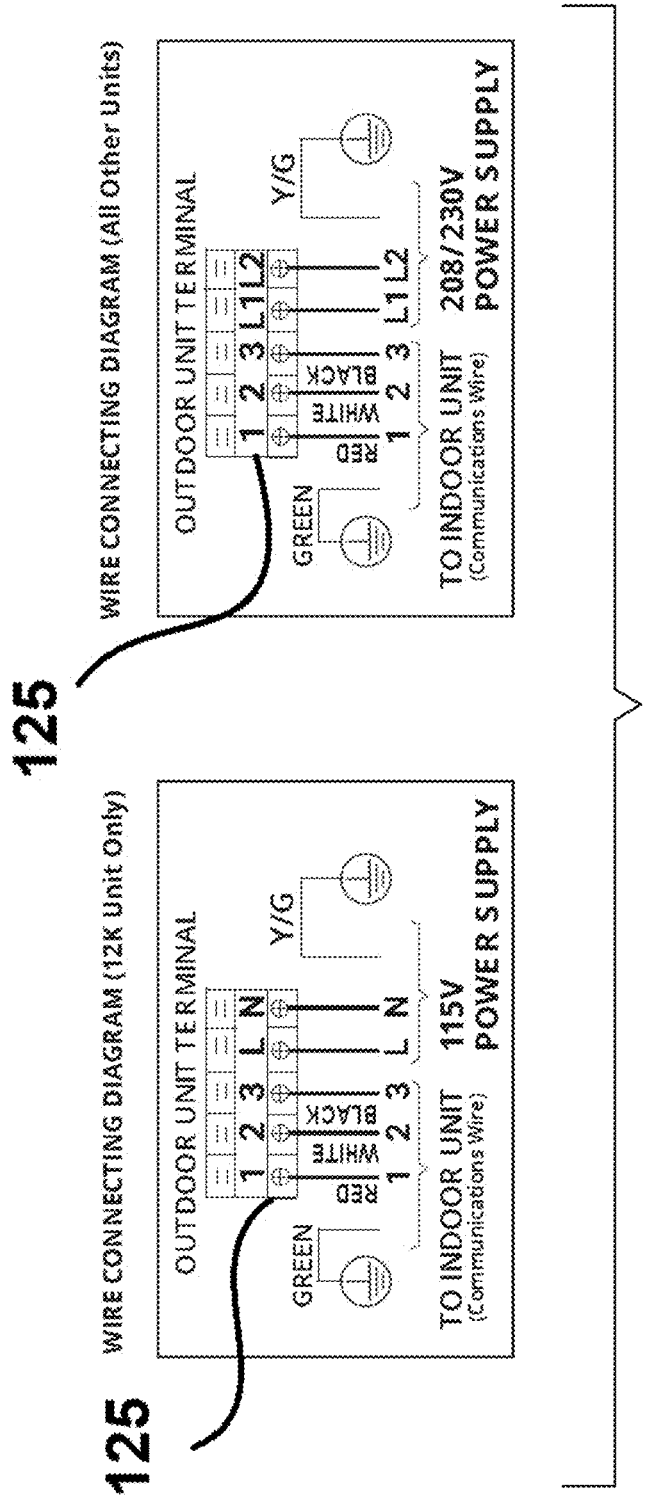
FIG. 17 displays a wiring diagram showing connections of the power cables and signal cables of the present invention to the outdoor unit.

4. Then, the amateur connects the signal cables originating from the indoor unit to the outdoor unit. (430) A terminal block is disposed on the outside unit, which is protected by an electrical wiring cover disposed on the side of the outdoor unit. A wiring diagram is preferably present on the interior of the wiring cover to facilitate proper installation. The wiring diagram may also be seen in FIG. 17, which depicts connection points (125) including those labeled 1, 2, and 3 reserved for the signal cables (40), and L1 and L2, reserved for power cable (50) connections.

5. Next, the amateur begins connecting the refrigerant piping (line-set) to the outdoor unit. (440) To facilitate connection of the refrigerant piping, the refrigerant piping ends are individually labeled, preferably with the letters 'A,' 'B,' 'C,' and 'D.' Additionally, the connectors disposed on the indoor unit and the outdoor unit are also labeled with corresponding letters. To begin, the amateur first removes the water shield of the outdoor unit, providing access to the male quick connect connectors of the outdoor unit. (450) Then, the amateur removes the plastic seals from the outdoor unit connectors and the appropriate refrigerant pipes just prior to connection of the refrigerant piping. (455) The amateur aligns the line-set such female quick-connect connectors of the line-set line up with the male connectors, and are not stressed. The amateur then screws the female quick-connect connectors onto the male connectors loosely by hand. (460) Then, the amateur tightens a bottom screw connector first, and then a top screw connector second, using an open ended wrench. The amateur holds a point marked "1" using the open-ended spanner and turns the nuts of the refrigerant piping only at the points marked with a "2." (470) It should be noted that the refrigerant pipes must be connected to the connectors on the outdoor unit with as little stress as possible. Additionally, as the coupling of the refrigerant piping employs tapping rings, the system may leak if the connection is removed and then reconnected.

6. Next, the amateur removes the top cover disposed on the top valve/connector, and turns it counter-clockwise as far as possible, opening the valve. (480) It should be noted that the valve must be opened fully in order to prevent system malfunction and/or damage. The amateur should then screw the top cover back on to the top valve/connector, and tighten it to ensure it is sealed. (490)

7. Then, the amateur removes the bottom cover from the bottom valve, and opens the valve by turning the valve counter-clockwise as far as possible, fully opening the valve. (500) The amateur then reattaches the bottom cover, and tightens the screws so as to ensure that the cover is properly sealed. (510)

8. The amateur then checks each connection for leaks with leak detection spray, or with conventional soap and water. If any bubbles are present, a leak has been detected, and the quick-connect connectors to the valves must be re-tightened using an open-ended spanner. (520)

9. Installation of the outdoor unit (20) is now complete. (530) The electrical connections should be checked one final time prior to turning the unit on. The amateur then starts the system of the present invention such that operating pressures build up within the indoor unit (10) and outdoor unit (20). (540) A final check for leaks with a leak detection spray or soap and water should be conducted after activation.

After checking for leaks during operation, the amateur should allow the system to run for at least 30 minutes. The amateur may activate the system via the on/off button on the indoor unit (10), or via the remote control (80). The amateur should press the 'MODE' button of the remote control (80) to select 'COOL,' and select the lowest possible temperature, testing the cooling of the system. Then, the amateur should press the 'MODE' button of the remote control (80) to select HEAT, and select the highest possible temperature. Each should run for approximately five minutes, during which time, the following checks should be performed (in no particular order):

Ensure the unit has remained properly grounded;
Ensure that all electrical terminals are properly covered;
Ensure that the indoor unit (10) and outdoor unit (20) are solidly installed in position;
Ensure that all pre-charged line-set (30) refrigerant connection points (85) does not leak;
Ensure that water drains properly from the drain hose (25);
Ensure that all piping has remained properly insulated;
Ensure that the system performs the COOL function properly;
Ensure that the system performs HEAT function properly;
Ensure that the indoor unit (10) louvers rotate properly;
Ensure that the indoor unit (10) responds to the input of the remote control (80).

It should be noted that the system of the present invention should not be installed in proximity to the following: near any source of heat, steam, or combustible gas, near flammable items such as curtains or clothing, near a doorway, near obstacles that may block air circulation, or in a location subject to direct sunlight. Additionally, it should be noted that if the unit is frequently exposed to heavy rain or snow, the amateur should build a shelter above the unit so as to protect it from rain or now. The amateur should be careful to not allow the shelter to obstruct air flow around the outdoor unit.

The system of the present invention uses gapped spiraled wire or reinforced acrylic polymer to compose the protective coil (110). Other sufficiently strong yet flexible materials may alternatively be employed. The gap present between sections of the protective coil (110) may vary in accordance with the diameter of the conduit tubing on which the present invention is to be used. The gauge of the spiraled wire or reinforced acrylic polymer of the present invention may also vary with the type and size of conduit on which the present invention is to be used.

Alternate embodiments of the protective coil (110) component of the present invention may include rings which are spaced to be tighter together, either by virtue of the coiling process, or by virtue of the gauge of the wire used to construct the spiraled rings (also referenced as coils). As such, the gauge of the wire may vary, specifically in accordance with the diameter of the conduit tubing. In preferred embodiments of the present invention to be installed on refrigerant piping, a form of flexible conduit tubing, 12-gauge wire is employed. However, it should be understood that other wire gauges may be used instead. The gauge of the wire is likely to vary depending on if the present invention is to be used for unitary or ductless HVAC products.

It should be understood that the apparatus of the present invention is designed to maintain proper flow and prevent breakage of conventional conduit tubing, both during installation, and thereafter. The protective coil (110) provides necessary resistance to the conduit to prevent over-flexing of the flexible conduit, namely pre-charged line-set (30). It should be understood that the protective coil (110) of the spiralized wire are circular, and that there is no specific number of coils present in the apparatus of the present invention. While there is no specific number of rings required, it should be understood that the number used need be sufficient in order to extend several inches beyond both sides of the point at which the user wishes to enact a bend in the conduit. At the point of the bend, it should be noted that the rings of the protective coil (110) are preferably concentrated, as they are slightly bunched together as a side effect of the bending process.

It should similarly be understood that the protective coil (110) of the present invention may be employed on a variety of forms of conduit outside of the pre-charged line-set (30) of the present invention with minimal modifications. The size of the coil diameter, as well as the thickness of the protective coil (110) itself may require alteration in order to facilitate use on differing forms and sizes of conduit as needed. The gauge required preferably varies in accordance with the number of spiral segments of the protective coil (110) present in the iteration of the present invention.

Additionally, it should be noted that the preferred embodiment of the present invention is equipped with a layer of insulation (120) around the wire to prevent damage including degradation and corrosion, of the apparatus when exposed to the elements. The insulation (120) is preferably treated with UV protection, and is configured to remain permanently affixed to the line-set for the life of the pre-charged line-set (30).

The system of the present invention is preferably equipped with a Bluetooth™ receiver and/or WiFi dongle, which enables the present invention to connect to, and be manipulated from, a mobile device such as a mobile phone, tablet, or smart watch. The system employs conventional pairing techniques to connect the mobile device to the system of the present invention. By this connection, the end user of the system of the present invention may manipulate the temperature of the room via his or her mobile device, without the need to use the remote control (80). Additionally, programmable settings may be introduced, such as activating the system upon entry or proximity, activating the system at a specific temperature at specific times of day/month/year, as well as deactivating the system once a temperature threshold has been reached. In such embodiments, the indoor unit (10) is preferably outfitted with a proximity sensor.

Additionally, it should be understood that three primary embodiments of the system and method of the present invention are preferably available. Namely, the difference between the three embodiments relates to the pre-charged piping (30). In a first primary embodiment, the pre-charged refrigerant piping (30) is connected to the indoor unit (10) at the factory during manufacturing, while remaining disconnected from the outdoor unit (20). In a second embodiment, the pre-charged line-set (30) is pre-connected for the amateur installer to the outdoor unit. In a third embodiment, the pre-charged line-set (30) is remains disconnected from both the indoor unit (10) and the outdoor unit (20) for packaging and shipping of the system of the present invention. It should be understood that, in all embodiments of the present invention, the refrigerant charge in the pre-charged line-set (30) is pre-balanced for installation, meaning that no additional charging is necessary during installation unlike conventional mini-split installations.

It should also be understood that the pre-charged line-set (30) of the present invention is equipped with internal quick-release valves referenced as female quick-connect connectors (130), which are designed to open upon proper seating of the pre-charged line-set (30) to male quick-connect connectors (140) disposed on the indoor unit (10) and outdoor unit (20), two valves per pre-charged line-set (30) (one at each end of each pipe), for a total of four valves.

Figure 13:
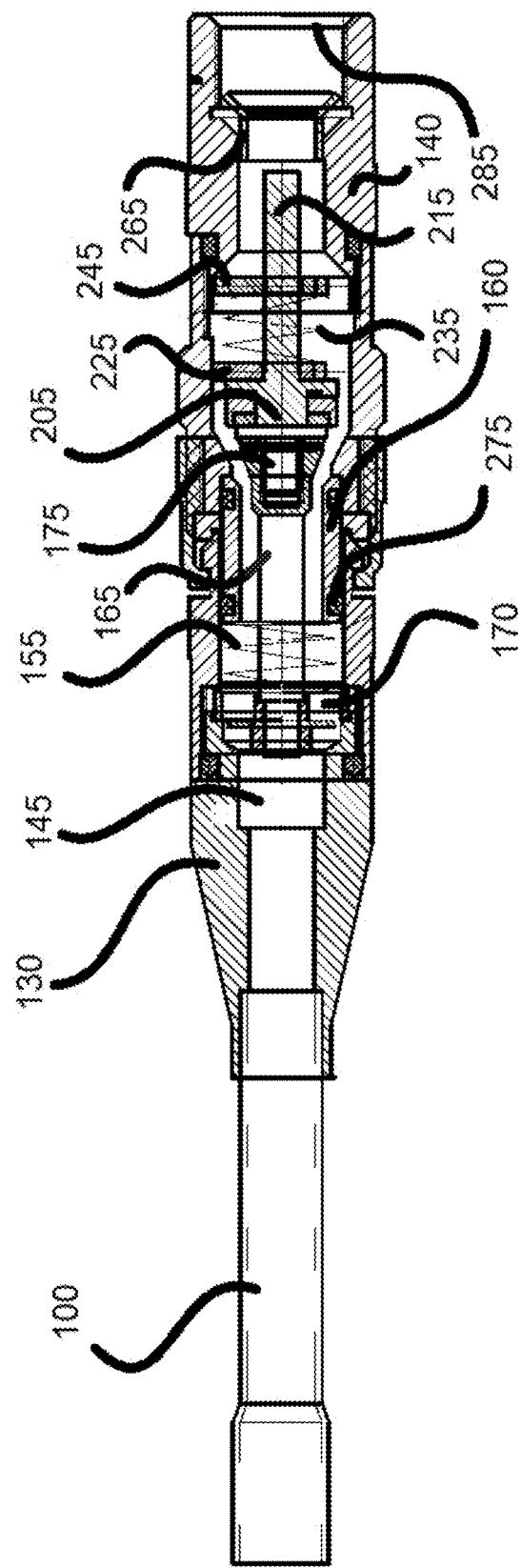
FIG. 13 depicts a side cut-away view of the female and male quick-connect connectors of the present invention shown coupled together.

Furthermore, it should be understood that the present invention includes a pre-charged line-set (30) configured for use with the aforementioned HVAC system which facilitates installation of the system by an amateur. The pre-charged line-set (30) is designed to connect to both internal and external (indoor and outdoor) units. The pre-charged line-set (30) includes a connecting pipe equipped with two female quick-connect connectors (130), one disposed on either end of the pre-charged line-set (30), which are configured to connect to male quick-connect connectors (140) disposed on both the indoor unit and outdoor unit of the HVAC system as shown connected in FIG. 13. Each female quick-connect connector (130) is equipped with a sealing locking device, present in the form of a valve head (205) in conjunction with a valve stem (215). Each male quick-connect connector (140) is equipped with an opening device configured to open the sealing device of the female quick-connect connector (130) when interfaced. It is through the use of these quick-connect fittings that the system of the present invention may be directly connected to the indoor unit (10) and outdoor unit (20) components of the HVAC system without vacuuming and therefore without requiring professional installation.

Figure 14:
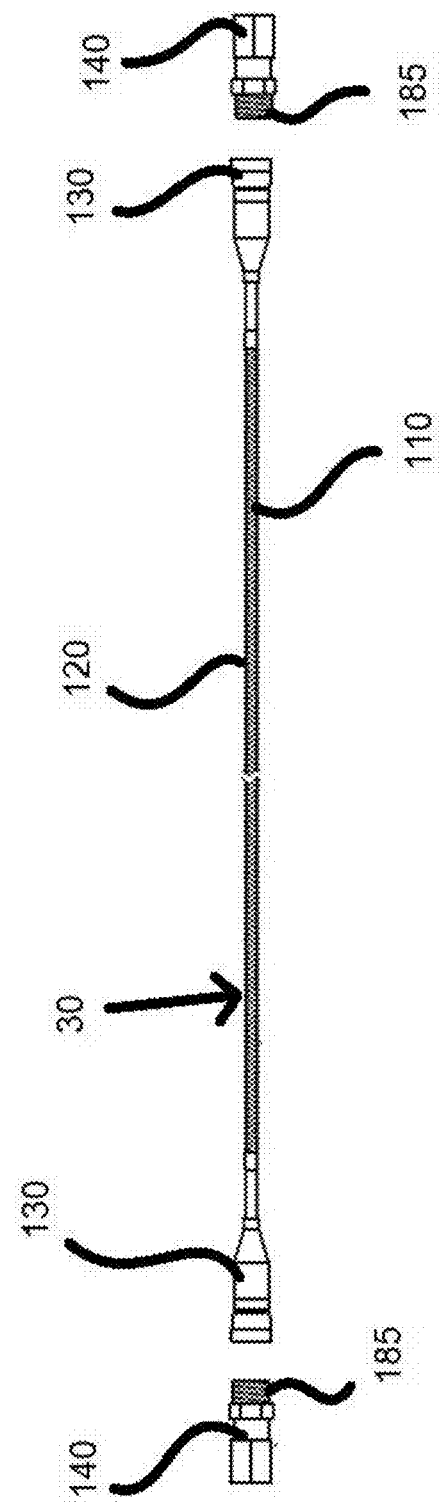
FIG. 14 exhibits a view of the entire line-set (one of two iterations) employed by the system of the present invention as seen from above.

The pre-charged line-set (30), as shown in FIG. 14, is outfitted with conventional conduit piping (100), a protective coil (110), and an insulation tube (120) circumscribing the entirety of the conduit piping (100) and the protective coil (110). Female quick-connect connectors (130) are disposed at either end of the pre-charged line-set (30), in communication with the conduit piping (100), and are equipped with a variety of features specifically designed for the containment of refrigerant within the pre-charged line-set (30) and the calculated release of the refrigerant into (and only into) the indoor and outdoor units (10, 20) of the HVAC system via mating male quick-connect connectors (140) disposed on the units themselves.

The female quick-connect connector (130) is equipped with a through hole (145) in which a seal locking device is disposed. The seal locking device includes a first return spring (155), an axle sleeve (160), and a rod (165). The axle sleeve (160) is configured to slide within the through hole (145) between an open position and return to a pressurized neutral (closed) position via force of the first return spring (155). The seal locking device of the female quick-connect connector (130) includes a shaft seat (150) disposed within the through hole (145), and is preferably fixed in position within the through hole (145). A plurality of axial holes (170) are preferably present on the shaft seat (150) which are configured to ensure uniform passage of the refrigerant through the connectors. There are preferably five small axial holes (170) present on the shaft seat (150) of the female connector. In certain optional embodiments, the rod (165) is fixed to the shaft seat (150) on a first end, and a second end of the rod (165) is equipped with a rod head (175) configured to interface with the opening device of the male quick-connect connector (140). At least one O-ring (295) is present near the rod head (175), disposed within a respective O-ring groove (275) of the axial sleeve (160), to ensure a firm seal between the through hole (145) and the axle sleeve (160) when the Axle sleeve (160) is pushed inwards, opening the seal locking device upon connection to the male quick-connect connector (140). The at least one O-ring (295) may include an inner O-ring and an outer O-ring. Likewise, the O-ring groove (275) may include an inner O-ring groove and an outer O-ring groove. The inner O-ring may be configured to maintain contact between the sleeve (160) and the through hole (145).

In contrast, the male quick-connect connector (140) is equipped with an axial through hole (190) adjacent to an opening device which is configured to facilitate the opening of a valve disposed within the male quick-connect connector (140) when mated to the female quick-connect connector (130). The opening device comprises a valve head (205), a valve stem (215) and a bracket. The bracket is formed by a front support plate (225), a second return spring (235) and a rear support plate (245), which enclose a cavity (195). One end of the valve head (205) abuts against one end of the cavity (195), and the second end of the valve head (205) is connected to the valve stem (215). The valve stem (215) is positioned such that it sequentially passes through the front support plate (225), second return spring (235) and the rear support plate (245) through openings in the front support plate (225) and rear support plate (245). The front support plate (225) may be slidably coupled within the cavity (195) and fixedly coupled to the valve stem (215). The rear support plate (245) may be fixedly coupled within the cavity (195) and slidably coupled to the valve stem (215). This configuration may be configured to permit movement of the valve stem (215) while maintaining its orientation.

A flared copper cap (265) is preferably disposed in the axial through hole (190) of the male quick-connect connector (140), away from the valve head (205). The flared copper cap (265) is preferably made of soft copper tubing. The flared copper cap (265) is configured to provide a better seal when the male quick-connect connector (140) is connected with the air conditional shut-off valve, acting like a gasket for the system. Use of the flared copper cap (265) enhances the capacity of the system of the present invention to be installed by an amateur without difficulty, as without the placement of the flared copper cap (265), additional effort would be required to tighten the quick-connectors of the present invention, increasing the risk of leakage.

Figure 15:
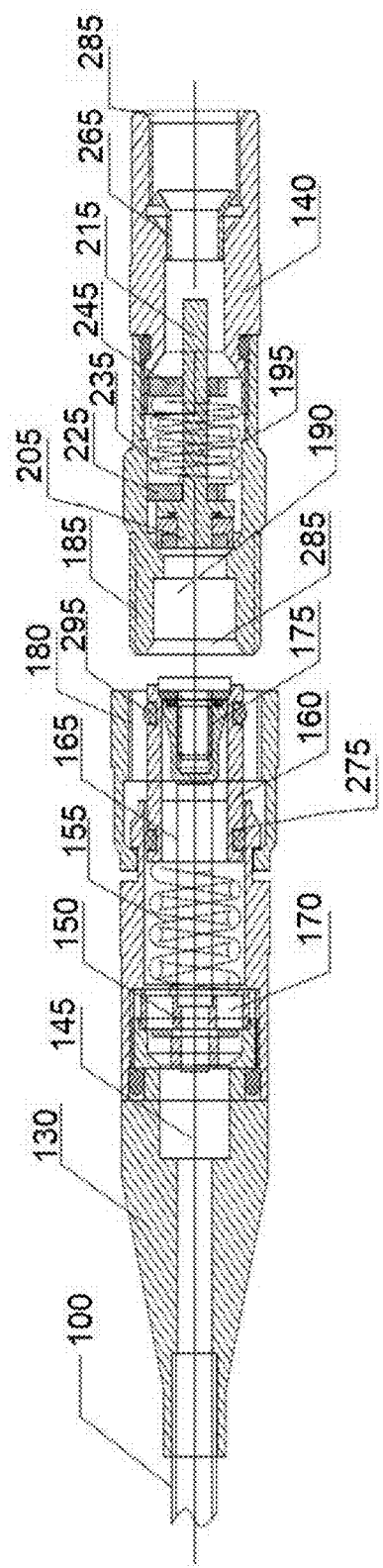
FIG. 15 shows a view of the female quick connect connector and the male quick connect connector disposed side-by-side, uncoupled.
Figure 16:
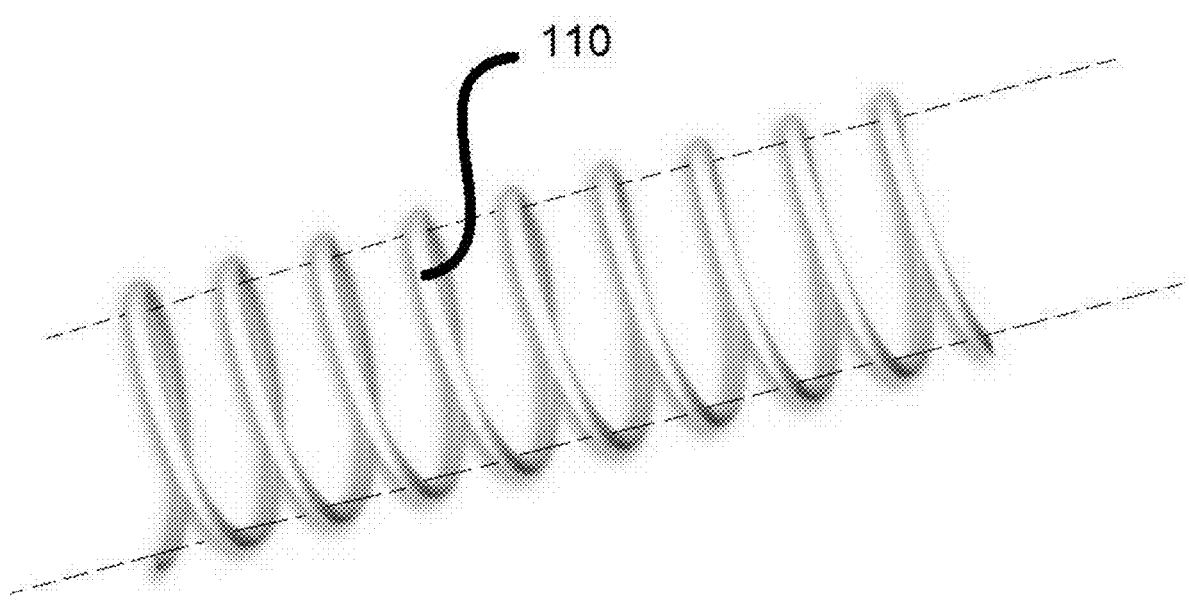
FIG. 16 shows a view of the protective coil separate from the line-set of the present invention.

As such, the male quick-connect connector (140) is configured to abut against the rod head (175) near the valve head (205) for sealing when connected to the female quick-connect connector (130). It should be understood that the valve head (205) and the front support plate (225) are slidably fitted within the cavity (195). Outer threads (185) of an outer wall of the male quick-connect connector (140) are configured to interface with inner threads (180) of the female quick-connect connector (130) when interfaced. The rod head (175) is circular and has a diameter greater than that of the rod (165) as shown in FIG. 15. The male quick-connect connector (140) is equipped with a 90 degree flaring (285) present at the tip of the male quick-connect connector (140), and is configured to facilitate the guidance of the male quick-connect connector (140) into the female quick-connect connector (130), as well as to ensure that the protruding portion (namely, the rod head (175)) of the female quick-connect connector (130) may easily move inwards towards the valve head (205) of the male quick-connect connector (140) as the axle sleeve (160) slides outward away from the rod head (175) to permit opening of the sealing mechanism of the male quick-connect connector (140) via the valve head (205), as well as to permit opening of the seal locking device of the female quick-connect connector (130) approximately simultaneously upon connection of the male quick-connect connector (140) to the female quick-connect connector (130).

It should be noted that the first return spring (155) and second return spring (235) are different springs with different force ratings. As such, the springs are not interchangeable in the manufacturing of the quick-connect connectors of the present invention. The valve of the male quick-connect connector (140) is opened by the rod (165) of the female connector, which pushes the valve head (205) of the male quick-connect connector (140) back, causing the second return spring (235) to compress. The support force of the rod (165) is greater than that of the second return spring (235). The force of the first return spring (155) of the female quick-connect connector (130) only supports the axle sleeve (160) when it enters the male quick-connect connector (140).

For clarity, it should be understood that the male quick-connect connectors (140) are equipped with the following structural components as shown in FIG. 15:
Outer Threads (185)
90 Degree flaring (285)
Axial through hole (190)
Cavity (195)
Valve head (205)
Front support plate (225)
Second return spring (235)
Rear support plate (245)
Valve stem (215)
Flared copper cap (265)

Similarly, it should be understood that the female quick-connect connectors (130) are equipped with the following structural components as shown in FIG. 15:
O-ring (295)
Inner threads (180)
Rod (165)
First return spring (155)
Axle sleeve (160)
O-ring groove (275)
Axial holes (170)
Through hole (145)
Shaft Seat (150)
Rod head (175)

Additionally, a manual valve (75) (rotating) is disposed near the refrigerant connection points (85) for the pre-charged line-set (30) on both the indoor unit and outdoor unit, for a total of four additional valves (one for each connector). In certain optional embodiments of the present invention, each pipe end is preferably labeled with a corresponding alpha-numeric character, which matches an alpha-numeric character disposed on each pre-charged refrigerant piping connection point, i.e 'A,' 'B,' 'C,' 'D,' etc. It should be understood that the manual valves (75) are only to be opened after the each female quick-connect connector (130) of the pre-charged line-set (30) are firmly seated and locked into position on the male quick-connect connectors (140) of the indoor unit (10) and outdoor unit (20) respectively.

Figure 18:
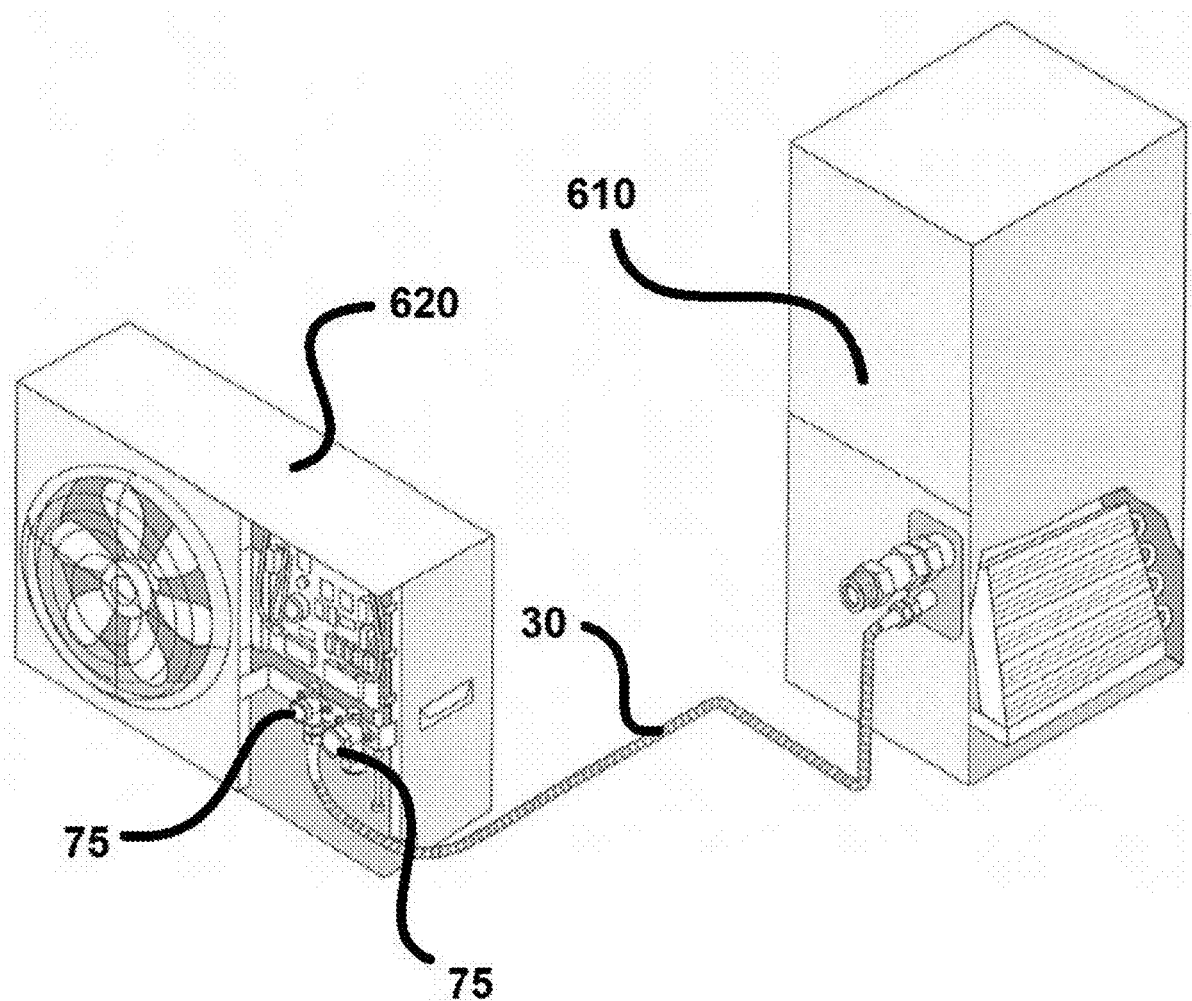
FIG. 18 shows the line-set of the present invention installed on a ducted HVAC system to depict a variant usage case of the quick-connect mechanisms of the present invention.

Alternate variations on the usage of the pre-charged line-set (30) including the male quick-connect connectors (140) and female quick-connect connectors (130) are envisioned for use in alternate embodiments of the present invention. These include, but are not limited to, the usage of the pre-charged line-set (30) of the present invention to facilitate the installation of conventional ducted HVAC systems. In such embodiments, the ducted HVAC air handler (610) is connected to the ducted HVAC condenser (620) via the pre-charged line-set (30) of the present invention via the quick-connector system by mating female quick-connect connectors (130) disposed on both ends of the pre-charged line-set (30) to male quick-connect connectors (140) disposed on the ducted HVAC air handler (610) and ducted HVAC condenser (620) as shown in FIG. 18.

Figure 19:
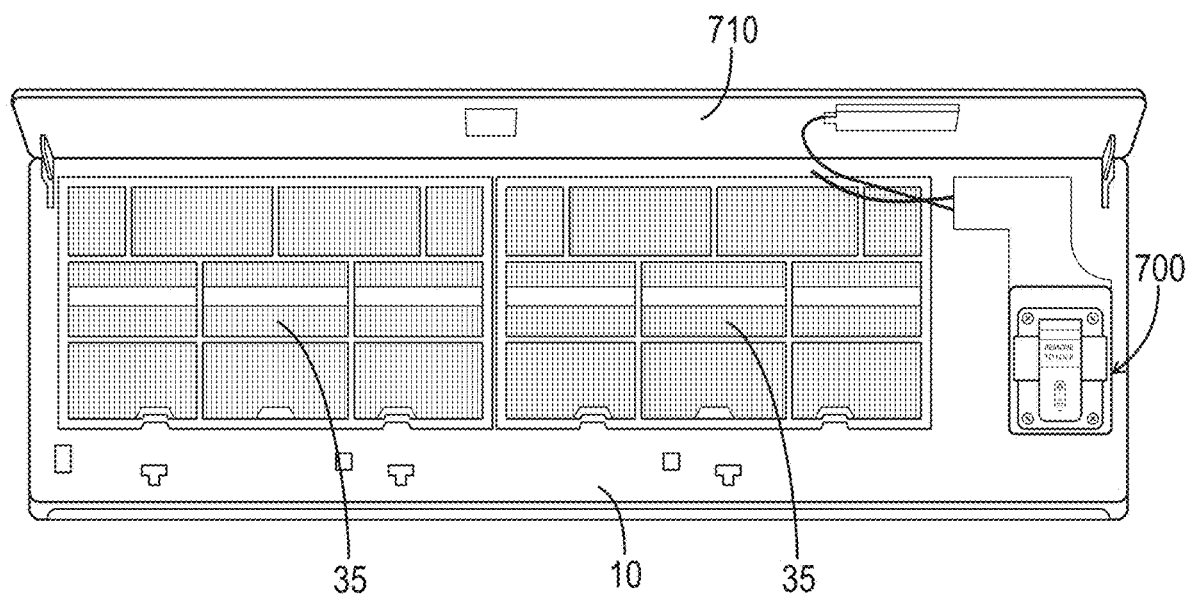
FIG. 19 shows the ductless air handling unit of FIG. 2A including a first embodiment of power shut-off switch in accordance with one embodiment of the present invention.
Figure 20:
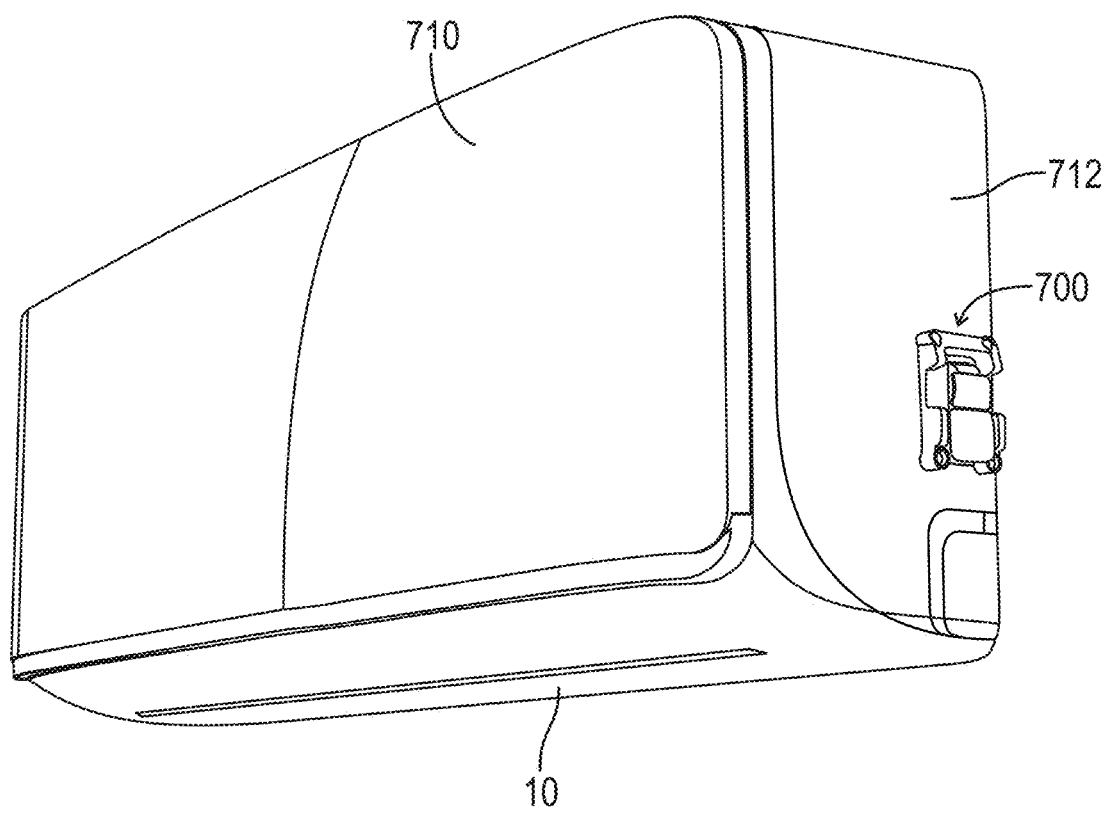
FIG. 20 shows the ductless air handling unit of FIG. 2A including a second embodiment of power shut-off switch in accordance with one embodiment of the present invention.

In certain optional embodiments, shown in FIGS. 19 and 20, the indoor unit (10) may include a shut-off switch (700). The shut-off switch (700) may also be referred to herein as a power shut-off switch (700) or an air gap switch (700). The shut-off switch (700) is configured to break the power connection provided by the signal cables (40) from the outdoor unit (20) to the indoor unit (10). The shut-off switch (700) may ensure that the indoor unit (10) is completely de-energized for servicing and/or maintenance.

The shut-off switch (700) may be integrally defined on the indoor unit (10). As shown in FIG. 19, the shut-off switch (700) may be positioned on the indoor unit (10) such that a front access panel (710) of the indoor unit (10) may cover the shut-off switch (700) when the front access panel (710) is positioned in a closed position. The front access panel (710) may be pivotally coupled to the indoor unit (10). As shown in FIG. 20, the shut-off switch (700) may be coupled to an exterior of the indoor unit (10), other than where the front access panel (710) is located. The shut-off switch (700) may, for example, be defined on an exterior end wall (712) of the indoor unit (10). In other optional embodiments, the shut-off switch (700) may be coupled to an upper surface or a lower surface of the indoor unit (10).

Additional details of the female quick-connect connector (130) are shown in FIGS. 21-22, with certain details repeated here for clarity. The female quick-connect connector (130) includes a through hole (145), a shaft seat (150), a rod (165), a rod head (175), a sleeve (160), at least one O-ring (295), and a first return spring (155). The through hole (145) may also be referred to herein as a first valve passageway (145). The through hole (145) may be communicatively linked between an inner first valve opening (770) and an outer first valve opening (772). The shaft seat (150) may be fixedly coupled within the through hole (145) nearer to the inner first valve opening (770) than to the outer first valve opening (772). The rod (165) may be fixedly coupled to the shaft seat (150) and may extend toward the outer first valve opening (772). The rod (165) may include a rod diameter (774). The rod head (175) may be disposed on the rod (165) distally to the shaft seat (150). The rod head (175) may include a rod head diameter (776) that is greater than the rod diameter (774). The sleeve (160) may be positioned within the through hole (145) between the shaft seat (150) and the rod head (175). The sleeve (160) includes an inner sleeve diameter (778) that is less than the rod head diameter (776). In certain optional embodiments, the rod head (175) and a portion of the sleeve (160) may be complimentarily shaped to fit together for forming a tight seal. The O-ring (295) is disposed in each of the one or more O-ring grooves (275) of the sleeve (160). At least one O-ring (295) is configured to maintain contact between the sleeve (160) and the through hole (145). The first return spring (155) may be disposed between the shaft seat (150) and the sleeve (160). The first return spring (155) may be configured to apply a force to the sleeve (160) such that the sleeve (160) is biased to contact the rod head (175) for closing the outer first valve opening (772) of the through hole (145). The inner threads (180) may be defined in the first valve passageway (145) nearer to the inner first valve opening (770) than to the outer first valve opening (772). The inner threads (180) may be configured to surround the sleeve (160).

Upon connection of the female quick-connect connector (130) with the male quick-connect connector (140), the sleeve (160) is moved toward the inner first valve opening (770) to thereby compress the first return spring (155) and to open the through hole (145) of the female quick-connect connector (130).

Figure 23:
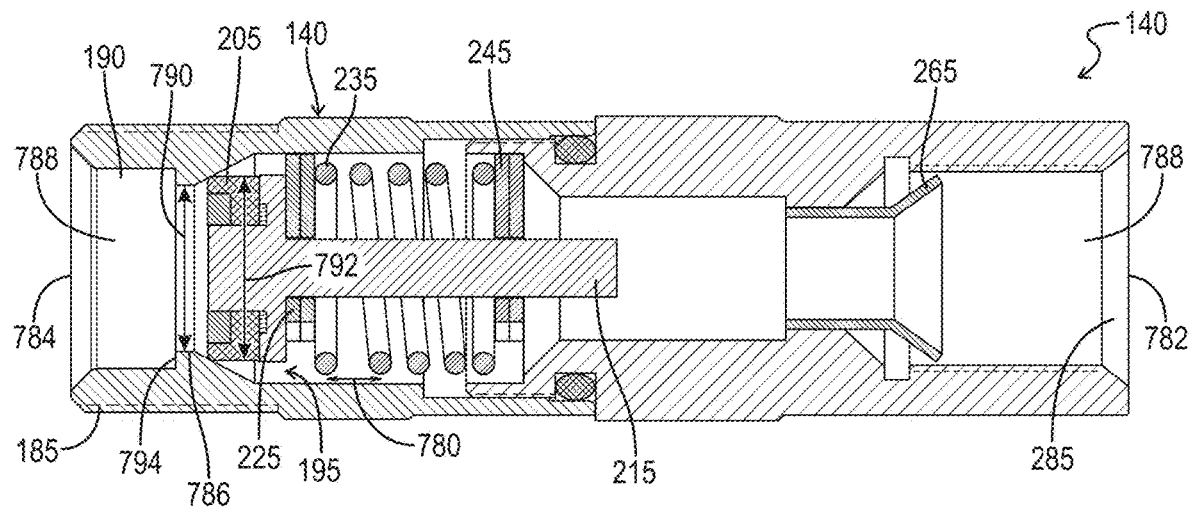
FIG. 23 shows an enlarged cross-sectional front elevation view a male quick-connect connector of the ductless HVAC system of FIG. 1 in a closed configuration.
Figure 24:
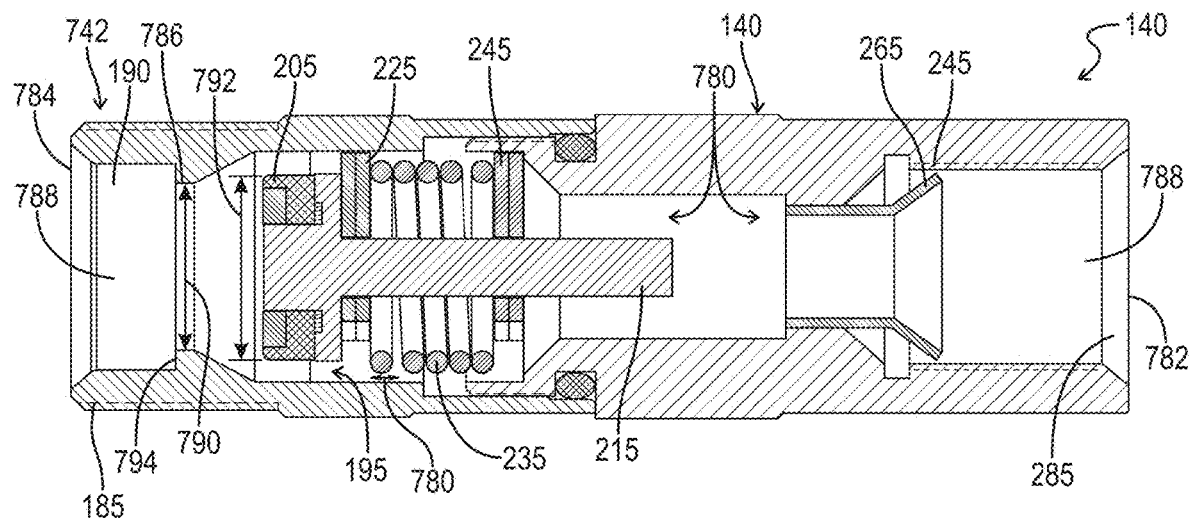
FIG. 24 shows an enlarged cross-sectional front elevation view the male quick-connect connector of FIG. 23 in an open configuration.

Additional details of the male quick-connect connector (140) are shown in FIGS. 23-24, with certain details repeated here for clarity. The male quick-connect connector (140) includes a second valve passageway (780), a rear support plate (245), a front support plate (225), valve stem (215), a valve head (205), and a second return spring (235). The second valve passageway (780) is communicatively linked between an inner second valve opening (782) and an outer second valve opening (784). The second valve passageway (780) may include a cavity portion (195) and a receptacle portion (788) separated by an intermediate second valve opening (786) having an intermediate second valve opening diameter (790) less than respective diameters of the cavity portion (195) and the receptacle portion (788). The cavity portion (195) may be positioned between the inner second valve opening (782) and the intermediate second valve opening (786). The receptacle portion (788) may be open to the outer second valve opening (784). The receptacle portion (788) may be configured to receive the axle sleeve (160) of the female quick-connect connector (130) such that an outer o-ring (295) of the axel sleeve (160) interfaces with the receptacle portion (788). The flared copper cap (265) may be positioned within the second valve passageway (780) nearer to the inner second valve opening (782) than to the intermediate second valve opening (786). The flared copper cap may be configured to interface with at least one valve (75) of the outdoor unit (20).

The rear support plate (245) may be fixedly coupled to the second valve passageway (780) closer to the inner second valve opening (782) than to the intermediate second valve opening (786). The front support plate (225) may be slidably received by the second valve passageway (780) closer to the intermediate second valve opening (786) than to the inner second valve opening (782). The valve stem (215) may be fixedly coupled to the front support plate (225) and slidably received through the rear support plate (245). The valve head (205) may be disposed on the valve stem (215) distally to the rear support plate (245). The valve head (205) may include a valve head diameter (792) that is greater than the intermediate second valve opening diameter (790).

The second return spring (235) may be disposed between the rear support plate (245) and the front support plate (225). The second return spring (235) may be configured to apply a force to the front support plate (225) such that the valve head (205) is biased to maintain contact with the intermediate second valve opening (786) to thereby close the intermediate second valve opening (786) of the second valve passageway (780). The front support plate (225) may remain at least partially in contact with the cavity portion (195) of the second valve passageway (780) during movement of the valve stem (215) within the second valve passageway (780).

Upon connection of the male quick-connect connector (140) with the female quick-connect connector (130), the valve head (205) is moved toward the inner second valve opening (782) to thereby compress the second return spring (235) and to open the intermediate second valve opening (786) of the second valve passageway (780).

In certain optional embodiments, the receptacle portion (788) of the second valve passageway (780) includes a 90-degree support rim (794) defined circumferentially about the intermediate second valve opening (786). In certain other optional embodiments, the 90-degree support rim (794) may be angled differentially. Upon connection of the female quick-connect connector (130) with the male quick-connect connector (140), the 90-degree support rim (794) of the male quick-connect connector (140) acts upon the sleeve (160) of the female quick-connect connector (100) to thereby open the female quick-connect connector (130). Likewise, the rod head (175) of the female quick-connect connector (130) acts upon the valve head (205) of male quick-connect connector (140) to thereby open the male quick-connect connector (140). These actions may occur simultaneously upon engagement of the female quick-connect connector (130) with the male quick-connect connector (140). Accordingly, the sleeve (160) is configured to selectively abut the rod head (175) for opening and closing the female quick-connect connector (130). Likewise, the valve stem (215) including the valve head (205) is configured to selectively abut the intermediate second valve opening (786) for opening and closing the male quick-connect connector (140).

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

Thus, although there have been described particular embodiments of the present invention of a new and useful apparatus and process for amateur HVAC installation it is not intended that such references be construed as limitations upon the scope of this invention except as set forth in the following claims.

What is claimed is:

1. An HVAC system comprising:
an indoor HVAC unit configured to be mounted to an interior wall of a structure, the indoor HVAC unit including at least one male quick-connect connector;
an outdoor HVAC unit configured to be placed outside of the structure, the outdoor HVAC unit including at least one valve coupled to the outdoor HVAC unit and at least one male quick-connect connector coupled to the at least one valve, the at least one valve configured to selectively release refrigerant from the outdoor HVAC to the at least one male quick-connect connector; and
a conduit lineset including a first lineset end, a second lineset end, and a refrigerant pressurized within the conduit lineset between the first lineset end and the second lineset end, each of the first and second lineset ends including at least one female quick-connect connector, the at least one female quick-connect connector of the first lineset end configured to be coupled to the at least one male quick-connect connector of the indoor HVAC unit, the at least one female quick-connect connector of the second lineset end configured to be coupled to the at least one male quick-connect connector of the outdoor HVAC unit, the at least one female quick-connect connector of each of the first and second lineset ends includes:
a female valve body;
a first valve passageway defined in the female valve body and communicatively linked between an inner first valve opening and an outer first valve opening;
inner threads defined in the first valve passageway nearer to the outer first valve opening than to the inner first valve opening, the inner threads configured to interface with outer threads of the male quick-connect connector;
a shaft seat fixedly coupled within the first valve passageway nearer to the inner first valve opening than to the outer first valve opening;
a rod fixedly coupled to the shaft seat and extending toward the outer first valve opening, the rod having a rod diameter;
a rod head disposed on the rod distally to the shaft seat, the rod head having a rod head diameter greater than the rod diameter;
a sleeve positioned within the first valve passageway between the shaft seat and the rod head, the sleeve having an inner sleeve diameter less than the rod head diameter;
an inner O-ring disposed within an inner O-ring groove of the sleeve, the inner O-ring configured to maintain contact between the sleeve and the first valve passageway; and
a first return spring disposed between the shaft seat and the sleeve, the first return spring configured to apply a force to the sleeve such that the sleeve is in contact with the rod head for closing the outer first valve opening of the first valve passageway, wherein:
the at least one female quick-connect connector of each of the first and second lineset ends and the at least one male quick-connect connector of each of the indoor HVAC unit and the outdoor HVAC unit are biased towards a closed position for containing the refrigerant therein until one of the at least one female quick-connect connectors is coupled to one of the male quick-connect connectors, and
the sleeve is configured to move toward the inner first valve opening to thereby compress the first return spring and to open the outer first valve opening of the first valve passageway upon connection of the at least one female quick-connect connector of the first lineset end with the at least one male quick-connect connector of the indoor HVAC unit and upon connection of the at least one female quick-connect connector of the second lineset end with the at least one male quick-connect connector of the outdoor HVAC unit.

2. The HVAC system of claim 1, wherein:
the at least one female quick-connect connector of each of the first and second lineset ends includes inner threads;
the at least one male quick-connect connector of each of the indoor HVAC unit and the outdoor HVAC unit includes outer threads; and
the inner threads are configured to mate with the outer threads upon connection of the at least one female quick-connect connector of the first lineset end with the at least one male quick-connect connector of the indoor HVAC unit and upon connection of the at least one female quick-connect connector of the second lineset end with the at least one male quick-connect connector of the outdoor HVAC unit.

3. The HVAC system of claim 1, wherein:
the inner threads are configured to surround the sleeve.

4. The HVAC system of claim 1, wherein:
the sleeve is configured to be at least partially received by a receptacle portion of the at least one male quick-connect connector of one of the indoor HVAC unit or the outdoor HVAC unit; and
the at least one female quick-connect connector of each of the first and second lineset ends further includes:
an outer O-ring disposed within an outer O-ring groove of the sleeve, the outer O-ring configured to interface with the receptacle portion of the at least one male quick-connect connector of one of the indoor HVAC unit or the outdoor HVAC unit.

5. The HVAC system of claim 1, wherein:
the conduit lineset includes a protective coil circumscribing the conduit lineset between the first and second lineset ends, the protective coil configured to prevent overbending of the conduit lineset.

6. The HVAC system of claim 5, wherein:
the protective coil comprises a reinforced acrylic polymer.

7. The HVAC system of claim 1, wherein:
the at least one male quick-connect connector of each of the indoor HVAC unit and the outdoor HVAC unit includes:
  a male valve body including a free end portion having outer threads defined thereon, the outer threads configured to interface with inner threads of the female quick-connect connector;
  a second valve passageway communicatively linked between an inner second valve opening and an outer second valve opening, the second valve passageway including a cavity portion and a receptacle portion separated by an intermediate second valve opening having an intermediate second valve opening diameter less than respective diameters of the cavity portion and the receptacle portion, the cavity portion positioned between the inner second valve opening and the intermediate second valve opening, the receptacle portion open to the outer second valve opening;
  a rear support plate fixedly coupled to the second valve passageway closer to the inner second valve opening than to the intermediate second valve opening;
  a front support plate slidably received by the second valve passageway closer to the intermediate second valve opening than to the inner second valve opening;
  a valve stem fixedly coupled to the front support plate and slidably received through the rear support plate;
  a valve head disposed on the valve stem distally to the rear support plate, the valve head having a valve head diameter greater than the intermediate second valve opening diameter; and
  a second return spring disposed between the rear support plate and the front support plate, the second return spring configured to apply a force to the front support plate such that the valve head is in contact with the intermediate second valve opening to thereby close the intermediate second valve opening of the second valve passageway, wherein:
the valve head is configured to move toward the inner second valve opening to thereby compress the second return spring and to open the intermediate second valve opening of the second valve passageway upon connection of the at least one female quick-connect connector of the first lineset end with the at least one male quick-connect connector of the indoor HVAC unit and upon connection of the at least one female quick-connect connector of the second lineset end with the at least one male quick-connect connector of the outdoor HVAC unit.

8. The HVAC system of claim 7, wherein:
the front support plate remains at least partially in contact with the cavity portion of the second valve passageway during movement of the valve stem within the second valve passageway.

9. The HVAC system of claim 7, wherein:
the at least one male quick-connect connector of each of the indoor HVAC unit and the outdoor HVAC unit further includes:
  a flared copper coupler positioned within the second valve passageway nearer to the inner second valve opening than to the intermediate second valve opening; and
  the flared copper coupler is configured to interface with the at least one valve of the outdoor HVAC unit.

10. The HVAC system of claim 1, wherein:
the indoor HVAC unit is electrically coupled to the outdoor HVAC unit such that the outdoor HVAC unit powers the indoor HVAC unit; and
the indoor HVAC unit includes a power shutoff switch integrally defined on the indoor HVAC unit, the power shutoff switch configured to electrically disconnect the indoor HVAC unit from the outdoor HVAC unit such that the indoor HVAC unit may by safely serviced.

11. The HVAC system of claim 10, wherein:
the power shutoff switch is coupled to an exterior of the indoor HVAC unit.

12. The HVAC system of claim 10, wherein:
the power shutoff switch is defined on an exterior end wall of the indoor HVAC unit.

13. The HVAC system of claim 10, wherein:
the indoor HVAC unit includes a front access panel pivotally coupled thereto; and
the power shutoff switch is configured to be covered by the front access panel when the front access panel is positioned in a closed configuration.

14. An HVAC lineset for coupling between an indoor HVAC unit and an outdoor HVAC unit, each of the indoor HVAC unit and the outdoor HVAC unit including one of a female quick-connect connector or a male quick-connect connector, the HVAC lineset comprising:
  a conduit piping having a first piping end and a second piping end, each of the first and second piping ends including one of a female quick-connect connector or a male quick-connect connector, the first piping end configured to be coupled to the indoor HVAC unit, the second piping end configured to be coupled to the outdoor HVAC unit, the female quick-connect connector includes:
  a female valve body;
  a first valve passageway defined in the female valve body and communicatively linked between an inner first valve opening and an outer first valve opening;
  inner threads defined in the first valve passageway nearer to the outer first valve opening than to the inner first valve opening, the inner threads configured to interface with outer threads of the male quick-connect connector;
  a shaft seat fixedly coupled within the first valve passageway nearer to the inner first valve opening than to the outer first valve opening;
  a rod fixedly coupled to the shaft seat and extending toward the outer first valve opening, the rod having a rod diameter;
  a rod head disposed on the rod distally to the shaft seat, the rod head having a rod head diameter greater than the rod diameter;
  a sleeve positioned within the first valve passageway between the shaft seat and the rod head, the sleeve having an inner sleeve diameter less than the rod head diameter;

an inner O-ring disposed within an inner O-ring groove of the sleeve, the inner O-ring configured to maintain contact between the sleeve and the first valve passageway; and a first return spring disposed between the shaft seat and the sleeve, the first return spring configured to apply a force to the sleeve such that the sleeve is in contact with the rod head for closing the outer first valve opening of the first valve passageway; and a refrigerant pressurized within the conduit piping between the first and second piping ends, wherein:

the sleeve is configured to move toward the inner first valve opening to thereby compress the first return spring and to open the outer first valve opening of the first valve passageway when the female quick-connect connector is coupled to the male quick-connect connector.

15. The HVAC lineset of claim 14, wherein:
the inner threads are configured to surround the sleeve.

16. The HVAC lineset of claim 14, wherein:
the female quick-connect connector further includes:
an outer O-ring disposed within an outer O-ring groove of the sleeve, the outer O-ring configured to interface with a receptacle portion of the male quick-connect connector of one of the indoor HVAC unit or the outdoor HVAC unit.

17. The HVAC lineset of claim 14, wherein:
the male quick-connect connector includes:
a male valve body including a free end portion having outer threads defined thereon, the outer threads configured to interface with inner threads of the female quick-connect connector;
a second valve passageway communicatively linked between an inner second valve opening and an outer second valve opening, the second valve passageway including a cavity portion and a receptacle portion separated by an intermediate second valve opening having an intermediate second valve opening diameter less than respective diameters of the cavity portion and the receptacle portion, the cavity portion positioned between the inner second valve opening and the intermediate second valve opening, the receptacle portion open to the outer second valve opening;
a rear support plate fixedly coupled to the second valve passageway closer to the inner second valve opening than to the intermediate second valve opening;
a front support plate slidably received by the second valve passageway closer to the intermediate second valve opening than to the inner second valve opening;
a valve stem fixedly coupled to the front support plate and slidably received through the rear support plate;
a valve head disposed on the valve stem distally to the rear support plate, the valve head having a valve head diameter greater than the intermediate second valve opening diameter; and
a second return spring disposed between the rear support plate and the front support plate, the second return spring configured to apply a force to the front support plate such that the valve head is in contact with the intermediate second valve opening to thereby close the intermediate second valve opening of the second valve passageway, wherein:
the valve head is moved toward the inner second valve opening to thereby compress the second return spring and to open the intermediate second valve opening of the second valve passageway when the male quick-connect connector is coupled to the female quick-connect connector.

18. The HVAC lineset of claim 17, wherein:
the front support plate remains at least partially in contact with the cavity portion of the second valve passageway during movement of the valve stem within the second valve passageway.

19. An HVAC lineset for coupling between an indoor HVAC unit and an outdoor HVAC unit, each of the indoor HVAC unit and the outdoor HVAC unit including one of a female quick-connect connector or a male quick-connect connector, the HVAC lineset comprising:
a conduit piping having a first piping end and a second piping end, each of the first and second piping ends including one of a female quick-connect connector or a male quick-connect connector, the first piping end configured to be coupled to the indoor HVAC unit, the second piping end configured to be coupled to the outdoor HVAC unit, the male quick-connect connector includes:
a male valve body including a free end portion having outer threads defined thereon, the outer threads configured to interface with inner threads of the female quick-connect connector;
a second valve passageway communicatively linked between an inner second valve opening and an outer second valve opening, the second valve passageway including a cavity portion and a receptacle portion separated by an intermediate second valve opening having an intermediate second valve opening diameter less than respective diameters of the cavity portion and the receptacle portion, the cavity portion positioned between the inner second valve opening and the intermediate second valve opening, the receptacle portion open to the outer second valve opening;
a rear support plate fixedly coupled to the second valve passageway closer to the inner second valve opening than to the intermediate second valve opening;
a front support plate slidably received by the second valve passageway closer to the intermediate second valve opening than to the inner second valve opening;
a valve stem fixedly coupled to the front support plate and slidably received through the rear support plate;
a valve head disposed on the valve stem distally to the rear support plate, the valve head having a valve head diameter greater than the intermediate second valve opening diameter; and
a second return spring disposed between the rear support plate and the front support plate, the second return spring configured to apply a force to the front support plate such that the valve head is in contact with the intermediate second valve opening to thereby close the intermediate second valve opening of the second valve passageway; and
a refrigerant pressurized within the conduit piping between the first and second piping ends, wherein:
the valve head is moved toward the inner second valve opening to thereby compress the second return spring and to open the intermediate second valve opening of the second valve passageway when the male quick-connect connector is coupled to the female quick-connect connector.

20. The HVAC lineset of claim 19, wherein:
the front support plate remains at least partially in contact with the cavity portion of the second valve passageway during movement of the valve stem within the second valve passageway.

\* \* \* \* \*